United States Patent
Adomi

(10) Patent No.: US 8,713,786 B2
(45) Date of Patent: May 6, 2014

(54) METAL RING AND METHOD OF PRODUCING THE SAME

(75) Inventor: Ryo Adomi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 482 days.

(21) Appl. No.: 13/063,840

(22) PCT Filed: Apr. 28, 2010

(86) PCT No.: PCT/JP2010/003042
§ 371 (c)(1),
(2), (4) Date: Mar. 14, 2011

(87) PCT Pub. No.: WO2011/135624
PCT Pub. Date: Nov. 3, 2011

(65) Prior Publication Data
US 2011/0269591 A1 Nov. 3, 2011

(51) Int. Cl.
 *B21B 13/22* (2006.01)
 *B21B 1/46* (2006.01)
 *B23P 17/00* (2006.01)
 *B23P 25/00* (2006.01)
 *C23C 8/26* (2006.01)
 *C23C 8/50* (2006.01)

(52) U.S. Cl.
USPC .......... 29/527.2; 29/527.1; 29/458; 148/230; 148/231; 148/232

(58) Field of Classification Search
USPC ............. 29/527.1, 527.2, 458; 474/242, 244; 148/230, 231, 232
See application file for complete search history.

(56) References Cited

U.S. PATENT DOCUMENTS

| 4,698,050 | A | * | 10/1987 | Hattori et al. | |
| 5,788,594 | A | * | 8/1998 | Lee | 474/244 |
| 6,110,065 | A | * | 8/2000 | Yagasaki et al. | 474/244 |
| 6,238,313 | B1 | * | 5/2001 | Smeets et al. | 474/244 |

(Continued)

FOREIGN PATENT DOCUMENTS

| JP | 11 173385 | 6/1999 |
| JP | 2001 329312 | 11/2001 |

(Continued)

OTHER PUBLICATIONS

International Search Report issued Aug. 3, 2010 in PCT/JP10/003042 filed Apr. 28, 2010.

Primary Examiner — Essama Omgba
Assistant Examiner — Darrell C Ford
(74) Attorney, Agent, or Firm — Oblon, Spivak, McClelland, Maier & Neustadt, L.L.P.

(57) ABSTRACT

To provide a metal ring excellent in durability by reducing decrease in margin of strength and concentration of tensile stress at its both widthwise end portions and to efficiently realize a production method of the same, a metal ring is formed in an endless band-like body having a nitride layer on its surface portion and constituting part of a metal belt of a belt type continuously variable transmission, the nitride layer being constituted by a first nitride layer portion positioned on an outer circumferential side, a second nitride layer portion positioned on an inner circumferential side, and third nitride layer portions positioned on both widthwise end sides, and the layer thicknesses of the third nitride layer portions being smaller than either one of the layer thicknesses of the first nitride layer portion and the second nitride layer portion.

2 Claims, 21 Drawing Sheets

(56) References Cited

U.S. PATENT DOCUMENTS

| | | | |
|---|---|---|---|
| 6,631,542 B1* | 10/2003 | Imai et al. | 29/417 |
| 6,663,724 B2* | 12/2003 | Imai et al. | 148/234 |
| 6,811,507 B2* | 11/2004 | Baumann et al. | 474/215 |
| 7,201,687 B2* | 4/2007 | Mott et al. | 474/157 |
| 8,449,418 B2* | 5/2013 | Sakanaka et al. | 474/242 |
| 8,479,396 B2* | 7/2013 | Streit et al. | 29/898.13 |
| 2001/0004616 A1* | 6/2001 | Brandsma et al. | 474/242 |
| 2002/0014281 A1* | 2/2002 | Heishi et al. | 148/230 |
| 2002/0132691 A1* | 9/2002 | Pennings et al. | 474/242 |
| 2005/0187056 A1* | 8/2005 | Wang et al. | 474/242 |
| 2005/0247375 A1* | 11/2005 | Suzuki et al. | 148/217 |
| 2006/0070685 A1* | 4/2006 | Grell et al. | 148/211 |
| 2006/0102253 A1* | 5/2006 | Berglund | 148/222 |
| 2012/0241050 A1* | 9/2012 | Takagaki et al. | 148/230 |

FOREIGN PATENT DOCUMENTS

| | | |
|---|---|---|
| JP | 2004 115836 | 4/2004 |
| JP | 2004 162134 | 6/2004 |
| JP | 2005 146355 | 6/2005 |

* cited by examiner

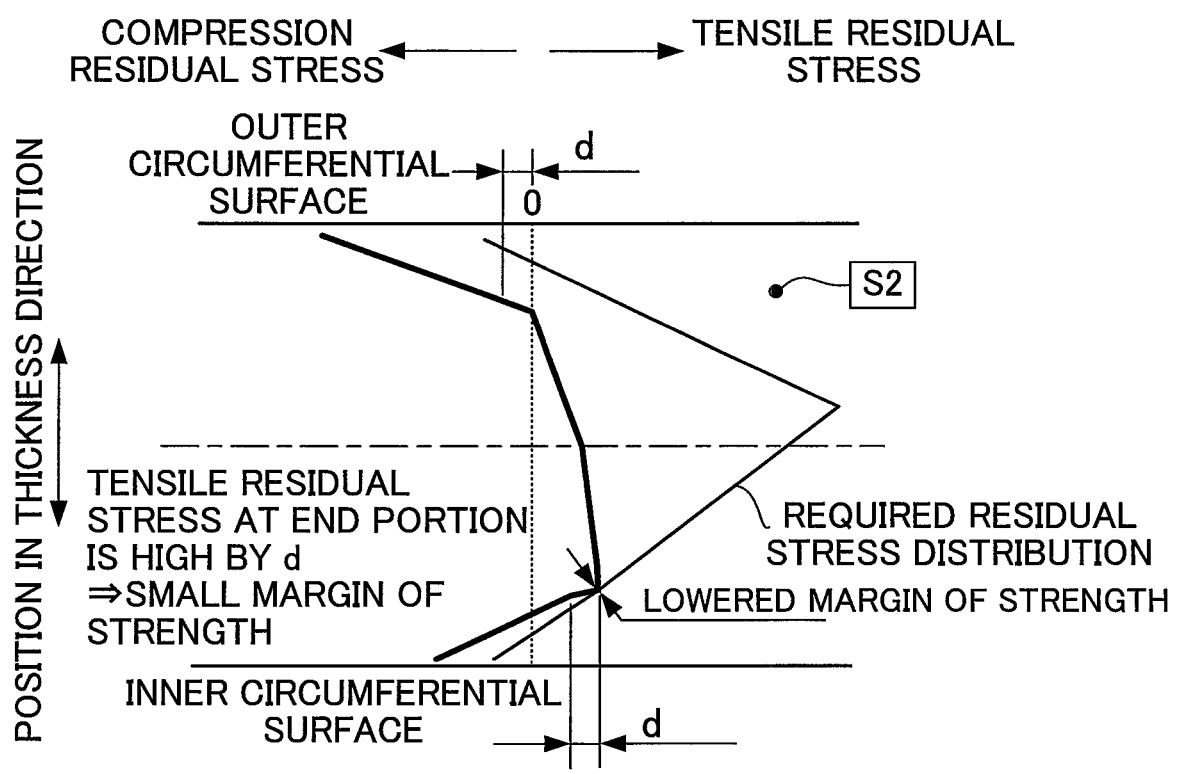

METAL RING AND METHOD OF PRODUCING THE SAME

TECHNICAL FIELD

The present invention relates to a metal ring and a method of producing the same and, more particularly, to a metal ring suitable for constructing a power transmission belt with a multiplicity of elements assembled in a stacked state for use in a belt type continuously variable transmission and a method of producing the metal ring.

BACKGROUND ART

There has so far been known a belt type transmission apparatus as a vehicular continuously variable transmission (hereinafter simply referred to as "CVT"). The belt type transmission apparatus comprises a drive side pulley and a driven side pulley serving as movable sheaves respectively, and an endless power transmission belt passing over the drive side pulley and the driven side pulley. Among such endless power transmission belts, there have so far been employed many push belt type CVTs each constituted by a metal ring of a stacked body having a predetermined thickness formed by stacking a plurality of belt-like thin plate metal ring and a multiplicity of elements stacked in the circumferential direction of the metal ring in a stacked state. The power transmission belt is constructed to have the multiplicity of the elements constrained in a wound shape with respect to the pulleys by the tensile strength of the metal ring, and held in pressurized contact with one another in the axial direction of the metal ring during the time period of moving from the drive side pulley to the driven side pulley, thereby making it possible to transmit drive force from the drive side pulley to the driven side pulley. The power transmission belt to be used for such a CVT is constituted by an endless band-like ring serving as a core material, and a multiplicity of elements having a predetermined thickness in the circumferential direction of the endless band-like ring and retained by the endless band-like ring. The elements are subject to being pressed toward the axial direction of the endless band-like ring, and serve to impart tensions to the endless band-like ring.

This kind of metal ring is produced by the steps of welding the ends of, for example, a maraging steel plate to form a cylindrical drum, performing a first solution treatment to make the cylindrical drum even in hardness, severing the cylindrical drum into a ring shape to make a plurality of rings each having a predetermined width, rolling the severed ring into a thin plate in the form of a thin plate metal ring, performing a second solution treatment to the thin plate metal ring to restore its shape of metal structure deformed by the rolling process, applying tension to the thin plate metal ring to correct its circumferential length to a predetermined circumferential length, and performing an aging and nitride treatment to produce a plurality of thin plate metal rings having respective circumferential lengths somewhat different from one another, and by stacking these thin plate metal rings in a nested state (see for example Patent Document 1).

Further, another method of producing the metal ring has been known with the steps of preparing a plurality of thin plate metal rings each made of maraging steel, fitting the thin plate metal ring on a circular jig larger in linear expansion coefficient than the material of the metal ring, heating the metal ring to an aging treatment temperature under the fitted state of the metal ring, and executing a circumferential length correction treatment of plastically deforming the metal ring so that the metal ring having a circumferential length small in variation with respect to the heat expansion of the circular jig can be somewhat increased in circumferential length by the jig. Through this method, the metal ring thus produced can be corrected to have a circumferential length within an allowable range even if the thin plate metal rings before being processed by the above method are somewhat varied in circumferential lengths (see for example Patent Document 2).

PRIOR ART DOCUMENTS

Patent Documents

Patent Document 1: Patent Publication No. 2001-329312 (see paragraph 0003)
Patent Document 2: Patent Publication No. H11-173385 (see paragraph 0012)

SUMMARY OF INVENTION

Problems to be Solved

However, the conventional metal rings and the methods of producing the same encounter such problems in that the metal rings produced are apt to form an even nitride layer, caused by the nitride treatment process, in the overall areas of surface portions (inner and outer circumferential surfaces, and both side surfaces) of each thin plate metal ring constituting the metal ring, thereby raising the tensile residual stress at the both widthwise end portions of the metal ring, and generating portions decreased in mechanical margin of strength. As a consequence, the portions decreased in mechanical margin of strength are inclined to have the tensile stress concentrated, thereby making it not possible to secure a sufficiently high durability to the metal ring.

More specifically, in the thin plate metal rings to be stacked on one another, the nitrogen infiltrated in the surface layer of the metal rings while material rings are subject to nitride treatment is formed into nitride (compound of nitrogen and a strengthening element of Ti and the like) at the time of the rings being age-hardened by maraging treatment. The thin plate metal ring thus produced has a metal crystal lattice strain larger toward its surface in response to its nitride concentration. As particularly shown in FIG. 17, the thin plate metal ring 100 has a nitride layer 101 having a central portion in the width direction (left and right direction in FIG. 17) of the metal ring in which the nitride layers 101a, 101b have compression residual stress in the circumferential direction of the metal ring generated larger toward the surfaces of the nitride layers 101a, 101b, and a non-nitride portion 100d on the inner side of the nitride layers 101a, 101b in which there is tensile residual stress caused by reaction. Meanwhile, the nitride layer 101e at the both end portions of the metal ring 100 is generated with a compression residual stress in the circumferential direction larger toward the surface of the nitride layer 101c, while the both end portions of the non-nitride portions 100d on the inner side of the nitride layer 101c have the tensile residual stress generated by reaction. For this end, the corner portions 100e at the both widthwise end portions of the non-nitride portions 100d positioned near the nitride layer 101a, 101b at the inner and the outer circumferential sides of the metal ring 100 and near the nitride layer 101c at the both widthwise end portions of the ring metal 100 lead to have high tensile residual stress. FIG. 18A shows a distribution Dn of residual stress required to obtain the durability required on the basis of the results of durability test of the metal ring 100. As seen from the distribution Dn, there is an amount of margin of strength sufficiently large enough at the central portion of the metal ring 100 in the width direction. However, there are decreased amounts of margin of strength at the both widthwise end portions of the metal ring 100 (portions corresponding to the corner portion 100*e* of the both widthwise end portions of the metal ring). In the other steps than the metal belt production step previously mentioned, the metal ring 100 can be treated to have a compression residual stress larger in the circumferential direction of the metal ring toward the surface of the metal ring 100. However, in any steps, there is caused compression residual stress mainly on the surface portion of the outer and the inner circumferential surfaces of the metal ring. The problems about the decrease in the amount of margin of strength and the concentration of stress are caused by the formation of the nitride layer evenly formed on the overall surface portions of the metal ring by the nitride treatment process.

In the conventional metal ring and the method of producing the same, in addition, the decrease in margin of strength of the thin plate metal ring such as the metal ring 100 leads to the decrease in margin of strength of the stacked body metal rings stacked on one another, so that it is not possible to reduce the number of thin plate metal rings stacked constituting the stacked body metal ring, thereby drawing a high cost to the power transmission belt for use in the continuously variable transmission.

The present invention has been made to overcome the conventional problems previously mentioned, and has an object to provide a metal ring excellent in durability by reducing the decrease in margin of strength at the both widthwise end portions of the metal ring and the concentration of tensile strength of the metal ring as well as to provide a metal ring production method capable of efficiently producing the metal ring.

Means for Solving Problems

To solve the previously mentioned problems, a metal ring according to the invention is (1) a metal ring formed as an endless band-like body having a nitride layer and constituting part of a metal belt of a belt type continuously variable transmission, the nitride layer being constituted by a first nitride layer portion positioned at an outer circumferential surface side of the band-like body, a second nitride layer portion positioned at an inner circumferential surface side of the band-like body, and third nitride layer portions respectively positioned at the both widthwise end portions of the band-like body, and a layer thickness of the third nitride layer portion being smaller than the layer thickness of either one of the first nitride layer portion and the second nitride layer portion.

According to the metal ring of the invention thus constructed, the corner portions at the both widthwise end portions of a non-nitride portion positioned near the first and the second nitride layer portions on the outer and the inner circumferential surface sides of the metal ring, respectively, and near the third nitride layer portions at the widthwise end portions of the metal ring are suppressible in tensile residual stress from becoming high resulting from the reduced layer thickness of the third nitride layer portion. It is therefore possible to suppress the decrease in margin of strength and the concentration of tensile stress in the both widthwise end portions of the metal ring, thereby enhancing the durability of the metal ring. The layer thickness here is intended to mean a hardened layer depth of the nitride layer or the nitride layer portion from the surface of the metal ring.

Alternatively, to solve the previously mentioned problems, a metal ring according to the invention is (2) a metal ring provided with a plurality of thin plate metal rings respectively formed as endless band-like bodies somewhat different in their circumferential lengths and respectively having nitride layers on their surface portions and stacked in a nested state constituting part of a metal belt of a belt type continuously variable transmission, each of the nitride layers being constituted by a first nitride layer portion positioned at an outer circumferential surface side of the endless band-like body, a second nitride layer portion positioned at an inner circumferential surface side of the endless band-like body, and third nitride layer portions positioned at both widthwise end portions of the endless band-like body, and a layer thickness of the third nitride layer portion being smaller than the layer thickness of either one of the first nitride layer portion and the second nitride layer portion.

According to the metal ring of the invention thus constructed, the corner portions at the both widthwise end portions of the non-nitride portion positioned near the first and the second nitride layer portions on the outer and the inner circumferential surface sides of each thin plate metal ring and near the third nitride layer portions at the widthwise end portions of the thin plate metal ring are suppressible in tensile residual stress from becoming high resulting from the reduced layer thickness of the third nitride layer portion. It is therefore possible to suppress the decrease in margin of strength and the concentration of tensile stress in the both widthwise end portions of the thin plate metal ring, thereby enhancing the durability of the metal rings stacked. Moreover, the stacking number of the thin plate metal rings can be reduced, thereby making it possible to reduce the production cost of the metal ring of stacked bodies.

In the metal ring described as in (2), it is desirable that (3) the nitride layer of each of the thin plate metal rings have chamfered shape portions having respective curved surfaces between the third nitride layer portion and the first nitride layer portion and between the third nitride layer portion and the second nitride layer portion, the thickness of the third nitride layer portion being larger in the chamfered shape portion as it is closer to either one of the first nitride layer portion and the second nitride layer portion.

Accordingly, the tensile residual stress at the corner portions of the both widthwise end portions of the non-nitride portion is sufficiently suppressed. It is therefore possible to reliably suppress the decrease in margin of strength and to enhance the durability of the metal ring.

In the metal ring described as in (3), it is preferable that (4) compression residual stresses in the first nitride layer portions of the thin plate metal rings be larger than the compression residual stresses in the second nitride layer portions.

Accordingly, the durability to the tensile strength and the bending force repeatedly given to the metal ring when the metal belt is assembled with the continuously variable transmission can be enhanced.

To solve the previously mentioned problems, a metal ring production method according to the invention is (5) a metal ring production method of producing a metal ring formed as an endless band-like body having a nitride layer on its surface portion and constituting part of a metal belt of a belt type continuously variable transmission, comprising a layer thickness adjustment step of making, when performing a nitride treatment to form the nitride layer to a material ring formed as an endless band-like body, a treatment condition or an inhibition condition for nitriding different between both widthwise end portions and widthwise central portion of the material ring to ensure that the layer thicknesses of nitride layer portions on end portion side formed at the both widthwise end portions of the material ring are smaller than the layer thicknesses of nitride layer portions on central portion side formed at the widthwise central portion of the material ring.

According to the metal ring production method of the invention thus constructed, only the adjustment made to provide different treatment and inhibition conditions for nitriding that affect nitriding easiness to the both widthwise end portions and the widthwise central portion of the material ring makes it possible for the layer thicknesses of the nitride layer portions at the end sides to be made smaller than the layer thicknesses of the nitride layer portions at the central side. This results in the fact that the tensile residual stress at the corner portions of the both widthwise end portions of the non-nitride portion close to the both nitride layer portions at the end side and at the central side is suppressed. It is therefore possible to suppress the decrease in margin of strength and the concentration of tensile stress in the both widthwise end portions of the metal ring, thereby making it possible to efficiently produce the metal rings excellent in durability without any complex treatments applied to the material ring.

In the metal ring production method described as in (5), it is desirable that (6) it further include a nitride inhibitor production step of producing nitride inhibitor at the both widthwise end portions of the material ring, and a nitriding step of nitriding the material ring after the nitride inhibitor production step in the nitride treatment to produce the nitride layer portions on the end portion side and the nitride layer portions on the central portion side.

Accordingly, a difference in nitriding is made in the nitride treatment making the layer thicknesses of the nitride layer at the both widthwise end portions of the material ring small and the layer thicknesses of the nitride layer at the widthwise central portion of the material ring large, thereby making it possible to reliably suppress the decrease in margin of strength in the both widthwise end portions of the metal ring and to produce the metal ring excellent in durability.

In the metal ring production method described as in (6), (7) it may further include a preparation step of preparing a cylindrical body made of steel material containing a specific strengthening element to exercise nitride inhibition action when oxidized, an annealing step of heating the cylindrical body to its annealing temperature and producing a concentration layer near a surface of the cylindrical body to have concentration of oxide of the strengthening element higher than a remaining area other than the surface of the cylindrical body and an absentee layer below the concentration layer to have the concentration of the oxide of the strengthening element lower than the steel material, a severing step of severing the cylindrical body after the annealing step to have a predetermined widthwise dimension to form a material ring, a concentration layer removal step of removing the concentration layer from outer and inner circumferential portions of the material ring while leaving at least a part of the absentee layer having a predetermined thickness, an oxidization step of oxidizing the surface of the material ring after the concentration layer removal step to produce an oxide film of the absentee layer at the widthwise central portion side of the material ring and an oxide film of the steel material at both widthwise end portion sides of the material ring, the oxide film of the steel material having the oxide of the specific strengthening element higher in concentration than that of the oxide film of the absentee layer, and a nitriding step of nitriding the material ring after the oxidization step in the state that the concentration of the oxide of the specific strengthening element between the central portion side and the end portion side of the material ring is different from each other in the nitride treatment to produce the nitride layer portions on the end portion side and the nitride layer portions on the central portion side.

Accordingly, the concentration layer and the absentee layer formed in the annealing step exist on the outer and the inner circumferential surfaces of the material ring immediately after severed from the cylindrical body in the severing step. However, when the concentration layer is removed in the concentration layer removal step with the absentee layer being left, after the concentration layer removal step, there exists the absentee layer at the widthwise central portion of the material ring, while no absentee layer exists at the both widthwise end portions of the material ring. In the oxidization step, the oxide serving to exercise the nitride inhibiting action is formed at the both widthwise end portions of the material ring to have a high concentration, while the oxide is not formed at the both surfaces of the widthwise central portion of the material ring causing a difference in nitriding degree. This results in that the nitride layer at the both widthwise end portions of the material ring becomes thin in thickness, while the nitride layer at the widthwise central portion of the material ring becomes thick in thickness. While it is not greatly different from the conventional production method except for the fact that the removal depth in the concentration layer removal step is adjusted to have the absentee layer left, the oxide serving to exercise the nitride inhibiting action is produced in a high concentration at the both widthwise end portions of the material ring before nitriding. It is therefore possible to efficiently produce the metal ring excellent in durability at low cost.

In the metal ring production method described as in (5), (8) it may further include a nitride inhibition film forming step of forming a nitride inhibition film on the surfaces of the both widthwise end portions of the material ring, and a nitriding step of nitriding the material ring formed with the nitride inhibition film in the nitride treatment to produce the nitride layer portions on the end portion side and the nitride layer portions on the central portion side.

Accordingly, the nitride inhibition film is formed on the surface of the both widthwise end portions of the material ring before the nitriding step, thereby making it possible to reliably suppress the decrease in margin of strength at the both widthwise end portions of the metal ring and to produce the metal ring excellent in durability. The nitride inhibition film can be formed by a partial plating method and the like. In the case of removing the nitride inhibition film after the nitriding step, a physically removing method such as a grinding brush or a chemically removing method such as a chemical etching method can be adopted.

In the metal ring production method described as in (5), (9) it may further include an arrangement step of arranging a plurality of material rings to be spaced apart from one another with a space gap in width directions of the material rings, a first gas flow step of flowing gas from one circumferential side of the material ring in the width direction to the other circumferential side of the material ring in such a manner that the gas flow speeds at outer and inner circumferential sides of the material rings are different from each other, and a second gas flow step of flowing gas between the material rings spaced apart from one another in the width directions from one circumferential side of the material ring to the other circumferential side of the material ring.

Accordingly, only making the gas flow speeds different on the outer circumferential side and the inner circumferential side of the material rings can make the gas to flow from one of the outer or inner circumferential side of the material rings to the other circumferential side. Therefore, the gas flow speeds on the outer circumferential side, the inner circumferential side, and the both widthwise end portions of the material rings can be adjusted to adjust the thicknesses of the nitride layers of the respective portions. Consequently, the layer thickness of the nitride layer near the concentration point of the stress of the fatigue endurance can be made to have a large layer thickness to raise the residual compression stress, while the layer thickness of the nitride layer near the contact points with the elements constituting the power transmission belt of the continuously variable transmission can be made to have a large layer thickness to enhance the durability.

In the metal ring production method described as in (9), (10) in the arrangement step, the plurality of material rings may be spaced apart from and axially aligned with one another in the width directions of the material rings and, in the second gas flow step, a second gas flow may be produced at one side of the outer and the inner circumferential sides of the plurality of material rings to flow toward the other side of the outer and the inner circumferential sides of the plurality of material rings.

Accordingly, the speed and the direction of the second gas flow can be adequately adjusted, thereby making it possible to adequately adjust the layer thicknesses of the nitride layers on the outer circumferential side, the inner circumferential side, and the both widthwise end portions of the plurality of the material rings.

In the metal ring production method described as in (9), (11) in the arrangement step, the plurality of material rings may be spaced apart from one another in the width directions of the material rings and displaced from one another in the radial directions of the material rings and, in the second gas flow step, a second gas flow may be produced in part of the gas flow from one side of outer and inner circumferential sides of the plurality of material rings to the other side of the outer and the inner circumferential sides of the plurality of material rings.

Accordingly, the adjustment of the gas flow speeds and the difference in the gas flow speeds at the outer and the inner circumferential sides of the material rings can vary the gas flow speed near the both widthwise end portions of the material rings without using any special means for causing the second gas flow, thereby making it possible to adjust the layer thicknesses of the nitride layers on the outer circumferential side, the inner circumferential side, and the both widthwise end portions of the metal rings.

To solve the previously mentioned problems, a metal ring production method according to the invention may be (12) a metal ring production method of producing a metal ring formed as an endless band-like body having a nitride layer on its surface portion and constituting part of a metal belt of a belt type continuously variable transmission, comprising a nitride treatment step of forming a nitride layer to a material ring formed as an endless band-like body, and a layer thickness adjustment step of grinding surface portions of the nitride layer on both widthwise end portions of the material ring to reduce the thicknesses of the nitride layer portions on end portion side to ensure that the layer thicknesses of the nitride layer portions on the end portion side formed at the both widthwise end portions of the material ring are smaller than the layer thicknesses of the nitride layer portions on central portion side formed at the widthwise central portion of the material ring after the nitride treatment step is performed.

Accordingly, the grinding of the surface portions of the nitride layer portions on the end side makes it possible to make the layer thicknesses of the nitride layer portions on the end portion side smaller than the layer thicknesses of the nitride layer portion on the central portion side, while carrying out the same steps as those of the conventional method until the step of conducting the nitride treatment. This makes it possible to efficiently produce the metal ring excellent in durability by suppressing the decrease in margin of strength and the concentration of tensile stress in the both widthwise end portions of the metal ring.

Effect of Invention

According to the metal ring of the present invention, the layer thicknesses of the third nitride layer portions on the both widthwise end portions are made small with respect to the first and the second nitride layer portions on the both outer and inner circumferential surface sides of the metal ring or the thin plate metal rings constituting the metal ring, the corner portions at the both widthwise end portions of a non-nitride portion positioned are suppressed in tensile residual stress from becoming high, thereby making it possible to provide the metal ring excellent in durability by suppressing the decrease in margin of strength and the concentration of tensile stress in the both widthwise end portions.

According to the metal ring production method of the present invention, the conditions for producing the nitride layer portions or the working conditions after the nitride treatment are made different from each other to have the layer thicknesses of the nitride layer portions on the end portion side smaller than those on the central portion side, thereby making it possible to efficiently produce the metal ring excellent in durability by reducing the decrease in margin of strength and the concentration of tensile strength at the both widthwise end portions of the metal ring.

BRIEF DESCRIPTION OF DRAWINGS

FIG. 18B is a residual stress distribution view showing an amount of margin of strength at the both widthwise end portions of the conventional metal ring.

DESCRIPTION OF EMBODIMENTS

The preferred embodiments of the present invention will be described hereinafter with reference to the accompanying drawings.

First Embodiment

Figure 1:
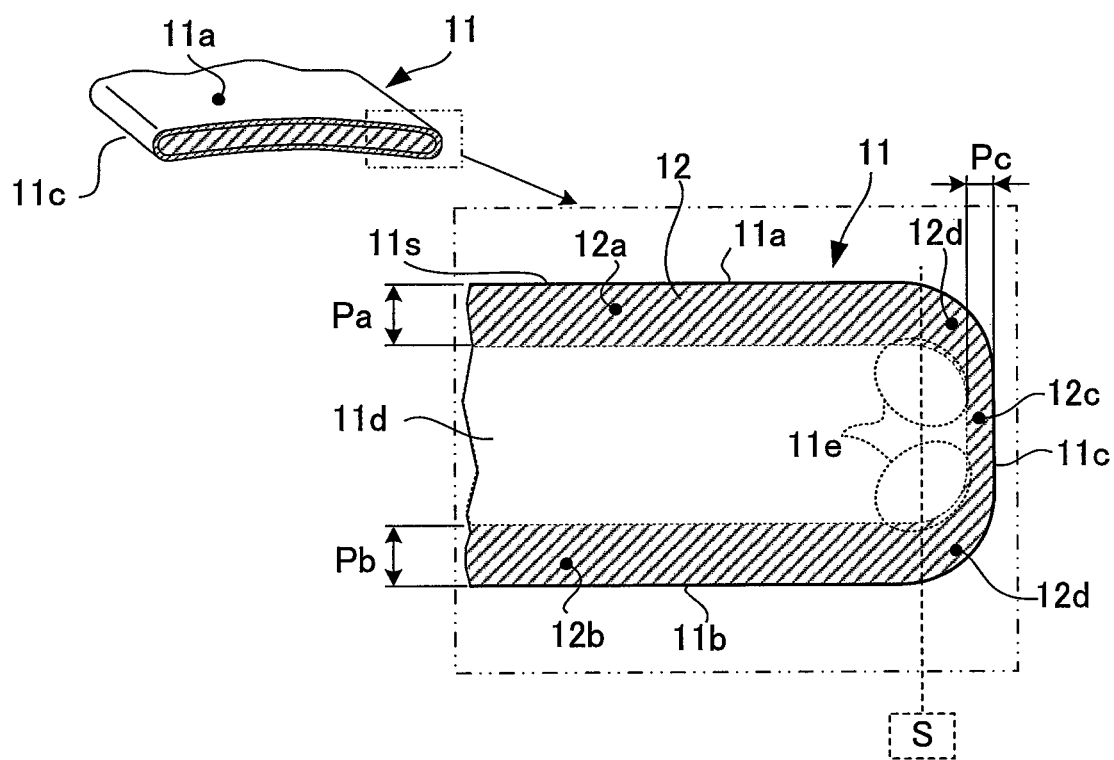
FIG. 1 is an enlarged fragmentary cross sectional view of an essential portion of a metal ring according to a first embodiment of the present invention.
Figure 2:
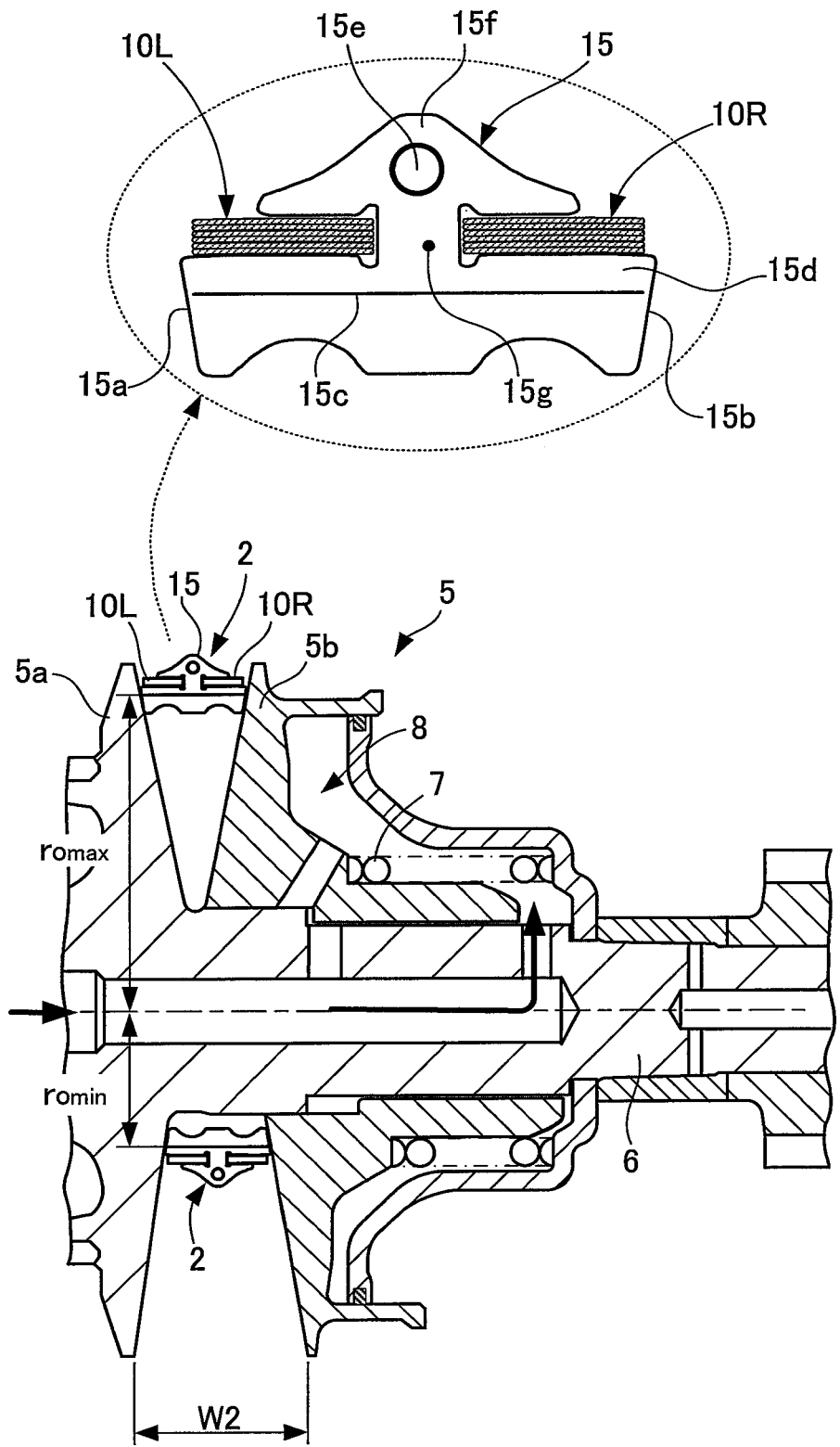
FIG. 2 is a cross sectional view of a belt type continuously variable transmission assembled with the metal ring according to the first embodiment of the present invention.
Figure 3:
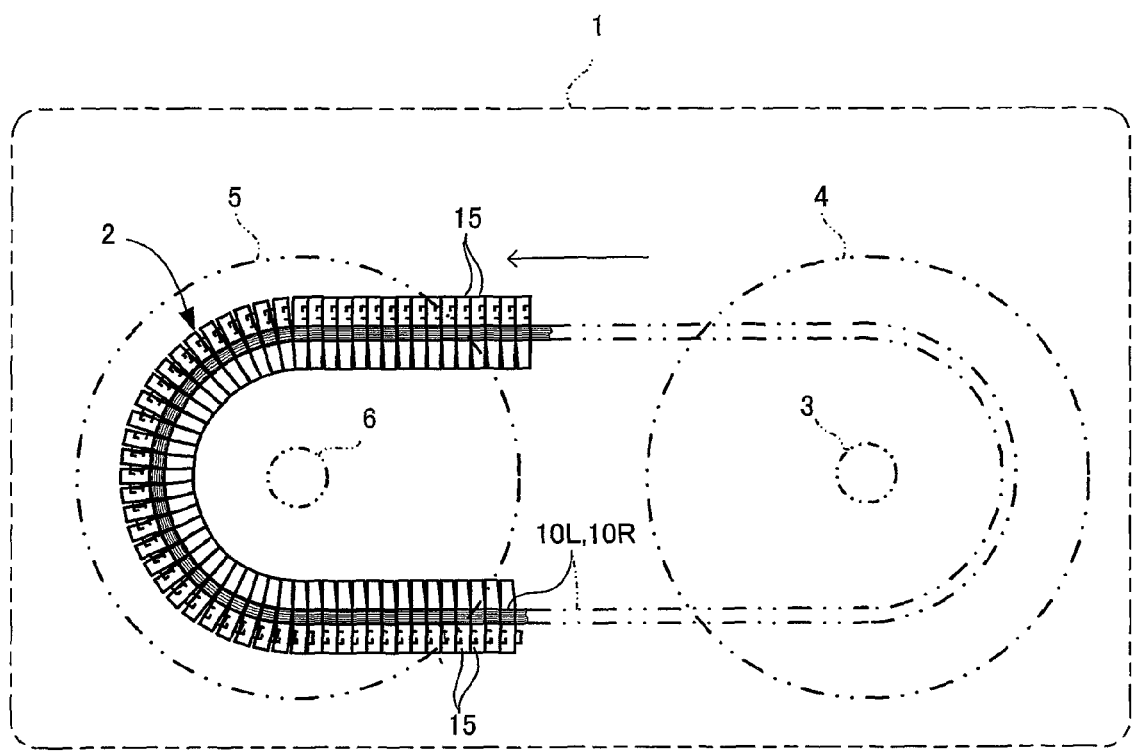
FIG. 3 is a fragmentary cross sectional view of a power transmission belt forming part of the belt type continuously variable transmission having a multiplicity of elements assembled with the metal rings according to the first embodiment of the present invention.
Figure 4:
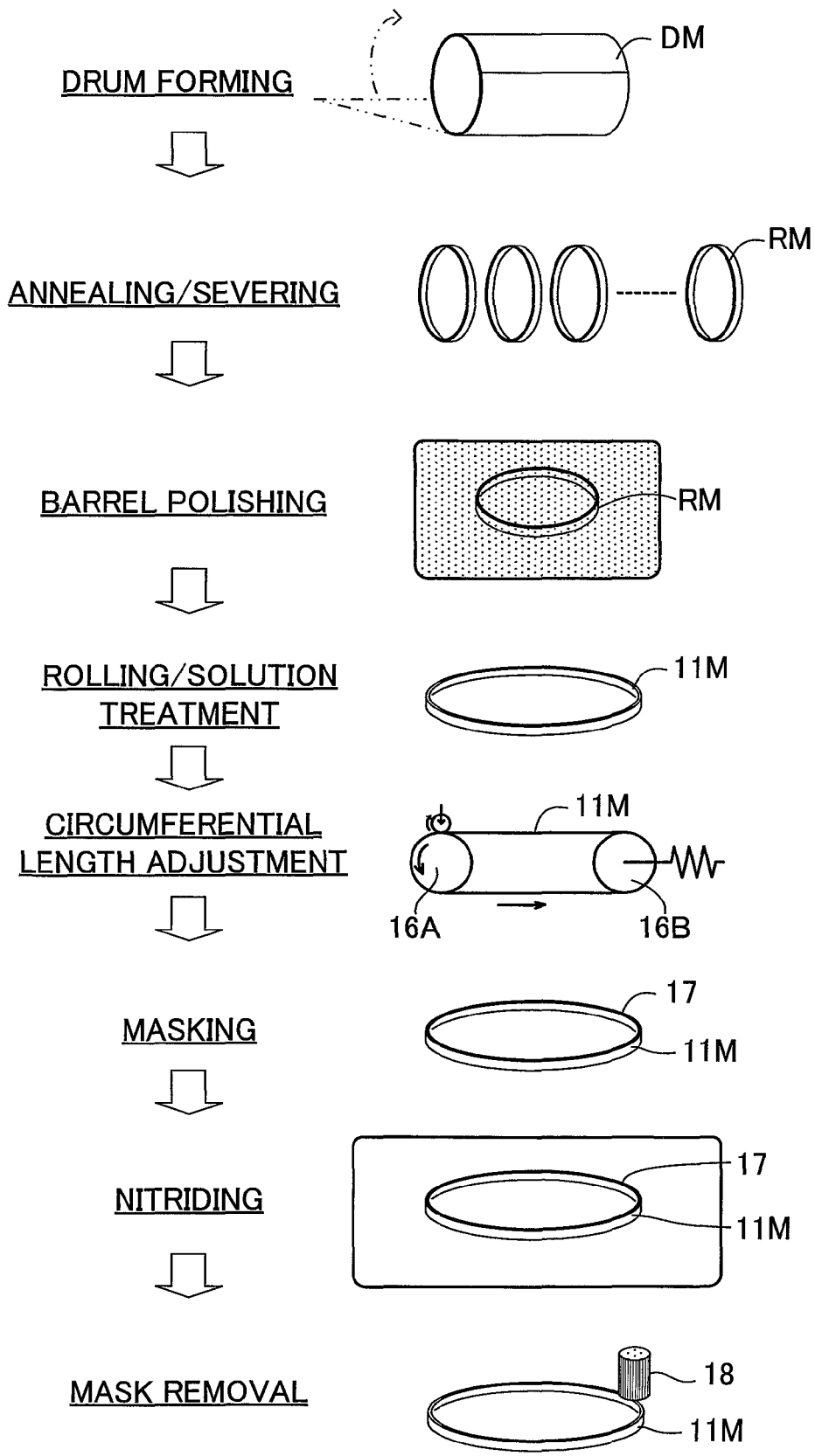
FIG. 4 is a process explanation view of a production method of the metal ring according to the first embodiment of the present invention.

FIGS. 1 to 3 show a metal ring according to a first embodiment of the present invention. FIG. 2 is a cross sectional view of a belt type continuously variable transmission assembled with the metal ring according to the first embodiment of the present invention. FIG. 4 shows a process flow of a production method of the metal ring according to the first embodiment of the present invention.

First, the construction of the metal ring will be explained hereinafter.

The thin plate metal ring 11 according to the present embodiment is partly shown in FIG. 1 as being formed into an endless band-like shape. The thin plate metal rings 11 are also shown in FIGS. 2 and 3 to constitute a pair of stacked body metal rings 10L, 10R by stacking the metal rings as a set in a nested state combining more than one kind of metal rings somewhat different in circumferential length from one another. The stacked body metal rings 10L, 10R collectively constitute part of a power transmission belt 2 of a belt type continuously variable transmission 1 (hereinafter simply referred to as a "continuously variable transmission 1"). As shown in a partly perspective view at the upper left portion of FIG. 1, the thin plate metal ring 11 is gently curved as having a widthwise central portion somewhat projecting outwardly from its both widthwise end portions.

The continuously variable transmission 1 is constructed to include a primary pulley 4 not shown to serve as an input side movable sheave (here, intended to mean an object in a pulley shape having a groove width variable) drivably connected with an input shaft 3, a secondary pulley 5 connected with an output shaft 6 to serve as an output side movable sheave, and the power transmission belt 2 passed over the both pulleys 4, 5 to transmit torque from the primary pulley 4 to the secondary pulley 5. The continuously variable transmission 1 is adapted to transmit drive force to left and right drive wheels from the output shaft 6 through a speed reduction gear mechanism and a differential gear device not shown in the drawings when the drive force is inputted to the input shaft 3 from an engine of a vehicle also not shown in the drawings through a clutch and a torque converter.

As shown in FIG. 2, the secondary pulley 5 comprises a fixed side second sheave member 5a fixed to the output shaft 6 of the continuously variable transmission 1, and a movable side second sheave member 5b axially movably supported on the output shaft 6 of the continuously variable transmission 1 to form a groove in a roughly V-shape between the first and the second sheave members 5a, 5b. The secondary pulley 5 is provided with a compression coil spring 7 for resiliently urging the secondary pulley 5 in a down shift direction to have the width W2 of the groove reduced, and a secondary hydraulic actuator 8 for actuating to urge the secondary pulley 5 in the down shift direction. The secondary hydraulic actuator 8 is designed to axially displace the movable side second sheave member 5b with the oil pressure being applied to the rear side of the movable side second sheave member 5b, so that the winding radius ro of the power transmission belt 2 on the secondary pulley 5 can be varied within the range from romin to romax as shown in FIG. 2.

Further, the primary pulley 4 is the same in construction as the secondary pulley 5 except for the urging member like the compression coil spring 7. Though not particularly shown in the drawings, the primary pulley 4 comprises a fixed side first sheave member fixed to the input shaft 3, a movable side first sheave member axially movably supported on the input shaft 3 to form a groove in a roughly V-shape between the first and the second sheave members, and a primary hydraulic actuator capable of urging the primary pulley in the up shift direction.

The power transmission belt 2 comprises at least one, for example, a pair of band-like stacked body metal rings 10L, 10R, and a plurality of elements 15 respectively formed in a plate shape stacked in its thickness direction along the stacked body metal rings 10L, 10R, and rockably and slidably assembled with the band-like stacked body metal rings 10L, 10R. Further, the elements 15 are stacked and banded to be pressurizable with one another through the band-like stacked body metal rings 10L, 10R.

The elements 15 have a plate thickness direction along the circumferential direction of the band-like stacked body metal rings 10L, 10R, and are assembled with the stacked body metal rings 10L, 10R in the state that a predetermined number of elements 15, for example, about four hundred elements 15 are stacked on one another.

More concretely, as shown in an enlarged view in FIG. 2, each of the elements 15 is constituted by a body portion 15d having both side end portions 15a, 15b held in engagement with the pulleys 4, 5 and a rocking edge portion 15c, a head portion 15f formed with a concave-convex engagement portion 15e having a concave and convex portion engaged with neighboring elements in the stack direction, and a neck portion 15g connecting the body portion 15d and the head portion 15f at its widthwise central portion. Between the body portion 15d and the head portion 15f at the both ends of the neck portion 15g of the element 15 is received a pair of band-like stacked body metal rings 10L, 10R. In the two curved sections of the power transmission belt 2 wound on the primary pulley 4 and the secondary pulley 5, the both side end portions 15a, 15b of the elements 15 are constructed to be pressurized by the primary pulley 4 and the secondary pulley 5 on the both sides in the widthwise direction of the power transmission belt 2.

On the other hand, the plurality of thin plate metal rings 11 collectively forming the band-like stacked body metal rings 10L, 10R are each made of maraging steel. As shown partly in cross section in FIG. 1, the thin plate metal ring 11 in an endless band-like shape has surface portions including an outer circumferential surface 11a, an inner circumferential surface 11b, both widthwise end surfaces 11c having respective nitride layers 12 formed therein and a non-nitride portion 11d on the inner side of the nitride layers 12. The maraging steel is made of low carbon steel containing much Ni (Nickel) added with age-hardening elements such as Ti (Titan), Al (Aluminum) and the like those of which serve as strengthening elements. The materials made of those elements are treated with an age-hardening to become a super strength steel of an age-hardening type having a high strength and toughness.

The nitride layers 12 are constituted by a first nitride layer portion 12a positioned at the outer circumferential surface 11a of the thin plate metal ring 11 in the form of an endless band-like body, a second nitride layer portion 12b positioned at the inner circumferential surface 11b of the thin plate metal ring 11, and third nitride layer portions 12c respectively positioned at the both widthwise end surfaces 11c (only one end portion shown in FIG. 1). The layer thicknesses Pc of the third nitride layer portions 12c are smaller than either one of the layer thicknesses Pa, Pb of the first and the second nitride layer portions 12a, 12b. Here, the layer thicknesses Pa, Pb, Pc stated above are each intended to mean a hardened layer depth of the nitride layer 12 or each of the nitride layer portions 12a, 12b, 12c (for example, a practical hardened layer depth based on a value of Vickers hardness Hv) from the surface 11s of the thin plate metal ring 11.

The nitride layer 12 of each of the thin plate metal rings 11 has four chamfered shape portions 12d having respective curved surfaces between the third nitride layer portion 12c and the first nitride layer portion 12a, and between the third nitride layer portion 12c and the second nitride layer portion 12b. The thickness Pc (hardened layer depth in the direction perpendicular to a tangent of the surface 11s) of the third nitride layer portion 12c is designed to be larger in the chamfered shape portion 12d as it is closer to either one of the first nitride layer portion 12a and the second nitride layer portion 12b. The radius of curvature of the surface of the chamfered shape portion 12d of the thin plate metal ring 11 is designed to be larger than the thicknesses Pa, Pb, Pc.

Though detailed description will appear hereinafter, in the stacked body metal rings 10L, 10R, the thin plate metal rings 11 have the first nitride layer portion 12a and the second nitride layer portion 12b having respective compression residual stresses larger than the compression residual stress of the third nitride layer portion 12c. The compression residual stress of the first nitride layer portion 12a positioned at the outer circumferential surface of the thin plate metal ring 11 is made larger by the compression residual stress of the second nitride layer portion 12b.

Here, the compression residual stresses of the first nitride layer portion 12a and the second nitride layer portion 12b, and the compression residual stresses of the third nitride layer portions 12c are set to have an amount of margin in a certain extent such that the actual residual stress is high on the compression residual stress side with respect to the value of required residual stress at each depth (required residual stress distribution) required for at least surface layer portion of each of the thin plate metal rings 11 to obtain required durability through previously conducted durability test results of the stacked body metal rings 10L, 10R. In other words, the nitride layer 12 and its neighboring portions are set to maintain a residual stress state to have an amount of margin in the aspect of durability fatigue strength (hereinafter simply referred to as "amount of margin of strength").

The residual stress state of each of the thin plate metal rings 11 is designed to have the compression residual stress heightened at the outer circumferential surface 11a and the inner circumferential surface 11b, in particular to the outer circumferential surface 11a of the thin plate metal ring 11, as a result of passing through a plurality of steps (exemplified by a circumferential length adjustment step and a nitride treatment step, or a stress peening step conducted at the final stage as required) of producing the thin plate metal ring 11 as will be described hereinafter.

Next, description will be made hereinafter about the thin plate metal ring 11 of the present embodiment and the method of producing the stacked body metal rings 10L, 10R constituted by the thin plate metal rings 11 stacked.

As shown in FIG. 4, the following steps are executed when the thin plate metal ring 11 is produced.

First, a plate material in a predetermined shape and of a maraging steel plate is prepared, and then the both ends of the plate material is welded to form a material drum DM of a cylindrical body (in a drum forming step in FIG. 4). The material drum DM is then severed into a plurality of material rings RM by a roll cutter not shown after conducting an annealing treatment to the material drum DM to lower the hardness near the welded portion of the material drum DM (in an annealing and a severing step in FIG. 4). Then, the material rings RM thus severed is polished by a known barrel polishing apparatus to remove burrs formed in the severing step, and the corner portions at the inner and outer sides of the both widthwise end portions of the material ring RM are chamfered to have respective curved surfaces (in a barrel polishing step in FIG. 4). Then, the material ring RM thus polished and chamfered is rolled to have a thickness reduced in a thin plate shape and to have a predetermined circumferential length, and then the material ring 11M undergoes a solution treatment to remove its rolling strain and to recrystallize the steel material (in step of a rolling and a solution treatment in FIG. 4) Then, the material ring 11M finished with the solution treatment is applied with tension in the state being wound around two rolls 16A, 16B to have a circumferential length adjusted to a high accuracy level (in a step of circumferential length adjustment in FIG. 4).

The above steps are almost the same as the steps conducted by the known method, but the method according to the present embodiment includes a step of forming a Ni plating film exemplified as an annular nitride inhibition film 17 containing a nitride inhibitor on the surfaces of the both widthwise end portions of the material ring 11M after the previously mentioned steps are carried out (in a masking step; in a step of forming a nitride inhibition film in FIG. 4).

The material ring 11M formed with the Ni plating film on the surfaces of the both widthwise end portions is then gas nitrided with ammonia gas ($NH_3$; may include ammonia gas containing nitrogen gas) at a temperature close to an aging precipitation treatment temperature of the maraging steel to undergo an aging and nitride treatment, so that the nitride layer 12 of the thin plate metal ring 11, viz., the third nitride layer portions 12c constituting the nitride layer portions at the both widthwise end portions of the thin plate metal ring 11, and the first nitride layer portion 12a and the second nitride layer portion 12b respectively constituting the nitride layer portions at the central portion of the thin plate metal ring 11 (in a nitriding step in FIG. 4). Here, the thin plate metal ring 11 is formed with the Ni plating film as a nitride inhibition film but may be formed with a Sn plating film in place of the Ni plating film. These nitride inhibition films may be formed on the thin plate metal ring 11 by other plating methods such as a partial plating method. Of course, these nitride inhibition films 17 can be formed by using a deposition technology other than the above mentioned plating technology.

In the case of removing the Ni plating film as the nitride inhibition film 17 after the nitriding step, the Ni plating film can be removed by a physically removing method such as a grinding brush 18 (for example, a grinding brush disclosed by Japanese Patent Publication No. 2006-255807). Of course, a chemically removing method such as a chemical etching method can be adopted other than the physically removing method.

Further, the outer circumferential surface 11a or the outer circumferential surface 11a and the inner circumferential surface 11b of the thin plate metal ring 11 may undergo a stress peening process (see, for example, Japanese Patent Publication No. 2002-45938) to add to the foregoing steps a step for raising the compression residual stress in the surface layer portions of the first nitride layer portion 12a and the second nitride layer portion 12b.

When, in this way, the thin plate metal rings 11 having a plurality of kinds of endless band-like shape somewhat different in circumferential length from one another finished with the aging and nitride treatment are produced, these thin plate metal rings 11 (six layers (six kinds) in FIG. 2) thus produced are stacked in a nested state to produce the stacked body metal rings 10L, 10R, and then the elements 15 are assembled with the stacked body metal rings 10L, 10R to produce the power transmission belt 2.

In the method of producing the thin plate metal ring 11 of the present embodiment, the surface portion of the band-like body formed as an endless band-like body has the nitride layer 12, and the plurality of steps are carried out to produce the stacked body metal rings 10L, 10R in a band-like shape forming part of the power transmission belt 2 of the continuously variable transmission 1. Prior to the nitriding step of performing the nitride treatment to form the nitride layer 12 to the material ring 11M formed as an endless band-like body among those steps of the producing the stacked body metal rings 10L, 10R, is carried out a step of preliminarily forming the Ni plating film as the nitride inhibition film to give a masking treatment to the both widthwise end portions to differ the inhibition conditions of the nitride treatment between the both widthwise end surfaces 11c of the material ring 11M and the outer and the inner circumferential surfaces 11a, 11b at the widthwise central portion of the material ring 11M. The above step of the masking treatment makes it possible for the layer thicknesses Pc of the third nitride layer portions 12c (nitride layer portions at the end portions) to be made smaller than the layer thicknesses Pa, Pb of the first and the second nitride layer portions 12a, 12b (nitride layer portions at the central portion) to execute a layer thickness adjustment of adjusting the layer thickness of the nitride layer 12 (layer thickness adjustment step).

Then, the operation of the metal ring according to the present embodiment and the method of producing the same will be explained hereinafter.

Figure 5:
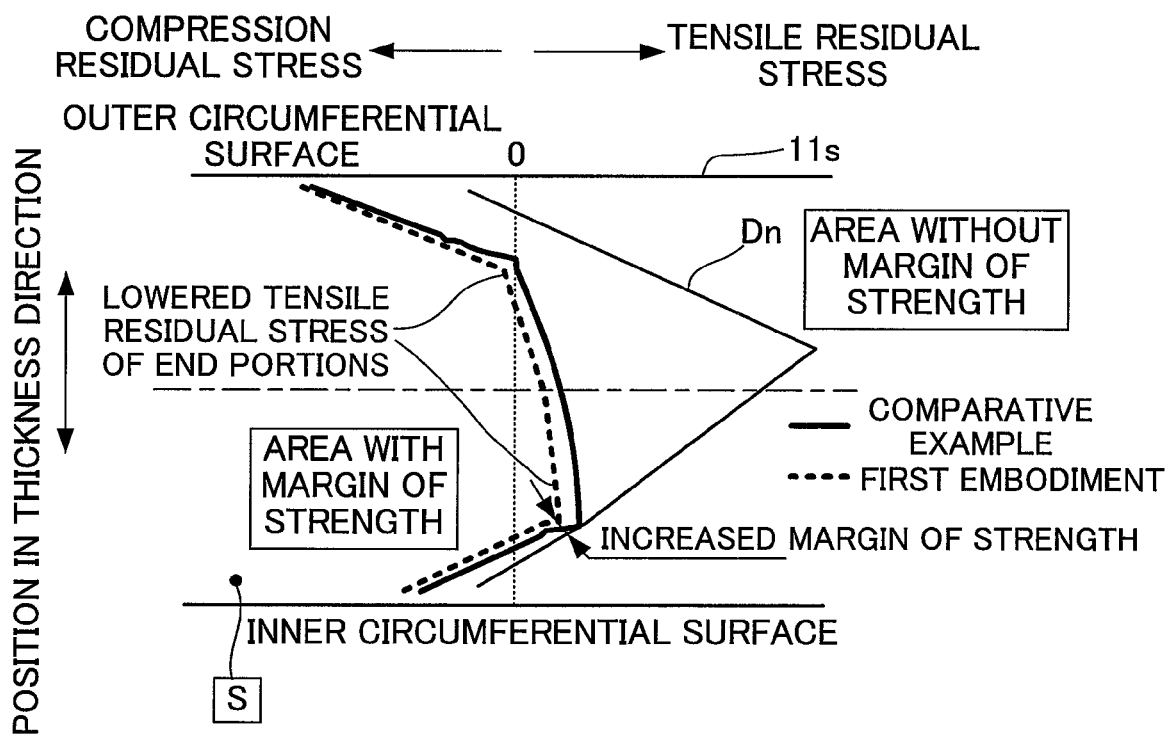
FIG. 5 is a residual stress distribution view showing an amount of margin of strength at both widthwise end portions of the metal ring according to the first embodiment of the present invention.

The plurality of thin plate metal rings 11 of the stacked body metal rings 10L, 10R according to the present embodiment thus constructed and produced are each formed with nitride (compound of nitrogen and strengthening elements such as Ti) as the nitrogen Ni infiltrated into the surface portion of the material ring 11M is age-hardened at the time of the nitride treatment, thereby generating the strain of the metal crystallization lattice in response to the concentration of the nitride. The cross section S (see FIG. 1) taken near the third nitride layer portion 12c at the both widthwise end portions of the thin plate metal ring 11 is shown in FIG. 5. Seen from this cross section is that the closer it is to the surface 11s of the thin plate metal ring 11, the larger the compression residual stress in the circumferential direction generated is, while a tensile residual stress is generated by reaction at the corner portions 11e of the both widthwise end portions of the non-nitrided portion 11d on the inner side of the nitride layer 12. This means that the corner portions 11e at the both widthwise end portions of the non-nitride portion 11d positioned near the third nitride layer portion 12c at the widthwise end portions of the thin plate metal ring 11 and near the first and the second nitride layer portions 12a, 12b of the thin plate metal ring 11 are likely to have a high tensile residual stress.

Figure 6:
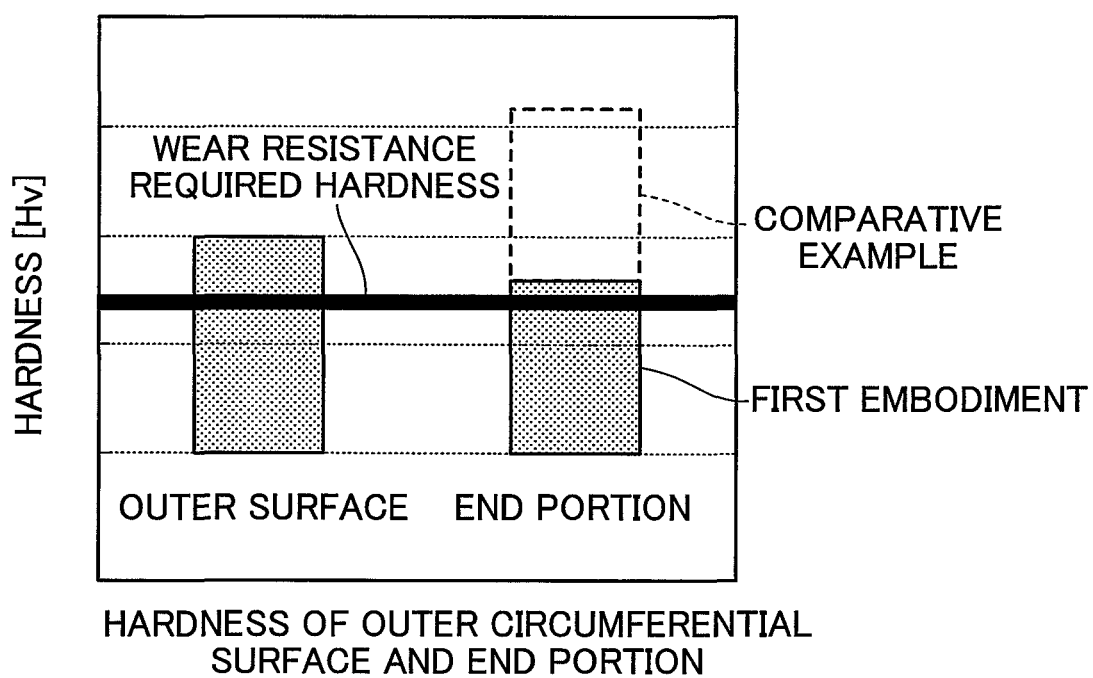
FIG. 6 is an operation explanation view of a production method of the metal ring according to the first embodiment of the present invention, and shows the difference between the surface hardnesses of the outer circumferential surface portion and the widthwise end portion of the metal ring.

However, in the present embodiment, as shown in FIG. 5, the layer thickness Pc decreased of the third nitride layer portion 12c at the both widthwise end portions of the thin plate metal ring 11 can provide the both widthwise end portions of the thin plate metal ring 11 with a hardness sufficiently high to the degree of securing the wear resistance required strength (see FIG. 6) with respect to the contact with the elements 15. It is therefore possible to raise the amount of margin of strength as seen from the required residual stress distribution Dn in FIG. 5 as compared with a comparative example (phantom lines in FIGS. 5 and 6) with the compression residual stress of the third nitride layer portion 12c being decreased and with the thicknesses of the both widthwise end portions of the metal ring similar in shape with the thin plate metal ring 11 being equal to the thickness of the widthwise central portion of the nitride layer of the metal ring 11. In other words, the corner portions 11e at the both widthwise end portions of the non-nitride portion 11d positioned near the first and the second nitride layer portions 12a, 12b of the thin plate metal ring 11 and near the third nitride layer portion 12c at the widthwise end portions of the thin plate metal ring 11 are suppressible in tensile residual stress from becoming high resulting from the reduced layer thickness of the third nitride layer portion 12c. It is therefore possible to suppress the decrease in margin of strength and the concentration of tensile stress in the both widthwise end portions of the thin plate metal ring 11, thereby enhancing the durability of the stacked body metal rings 10L, 10R. Moreover, the stacking number of the thin plate metal rings 11 can be reduced, thereby making it possible to reduce the production cost of the stacked body metal rings 10L, 10R.

Further, the thickness Pc of the third nitride layer portion 12c is designed at each of the chamfered shape portions 12d to be larger in the chamfered shape portion 12d as it is closer to either one of the first nitride layer portion 12a and the second nitride layer portion 12b, thereby making it possible to sufficiently suppress the tensile residual stress at the corner portions 11e of the both widthwise end portions of the non-nitride portion 11d. It is therefore possible to reliably suppress the decrease in margin of strength and to enhance the durability of the stacked body metal rings 10L, 10R.

Additionally, the compression residual stress of the first nitride layer portion 12a positioned at the outer circumferential surface of the thin plate metal ring 11 is larger than the compression residual stress of the second nitride layer portion 12a, thereby making it possible to enhance the durability to the tensile strength and the bending force repeatedly given to the stacked body metal rings 10L, 10R when the power transmission belt 2 is assembled with the continuously variable transmission 1.

Moreover, in the metal ring production method according to the present embodiment, only the adjustment made by the masking using the nitride inhibition film 17 to provide different conditions in nitriding easiness (treatment and inhibition conditions for nitriding) to the both widthwise end portions and the widthwise central portion of the material ring 11M makes it possible for the layer thicknesses Pc of the third nitride layer portions 12c (nitride layer portions at the end portions) to be made smaller than the layer thicknesses Pa, Pb of the first and the second nitride layer portions 12a, 12b. This results in the fact that the compression residual stress in the third nitride layer portion 12c can be suppressed, and the tensile residual stress at the corner portions 11e of the both widthwise end portions of the non-nitride portion 11d close to either one of the first nitride layer portion 12a and the second nitride layer portion 12b can be suppressed. It is therefore possible to suppress the decrease in margin of strength and the concentration of tensile stress in the both widthwise end portions of the thin plate metal ring 11, thereby making it possible to efficiently produce the stacked body metal rings 10L, 10R excellent in durability without any complex treatments applied to the material ring.

As will be understood from the foregoing description, the layer thicknesses Pc of the third nitride layer portions 12c are made smaller than the layer thicknesses Pa, Pb of the first and the second nitride layer portions 12a, 12b in the plurality of thin plate metal rings 11 constituting the stacked body metal rings 10L, 10R according to the present embodiment, thereby making it possible to suppress the decrease in margin of strength and the concentration of tensile residual stress in the both widthwise end portions of the thin plate metal ring 11 and to provide the stacked body metal rings 10L, 10R and the power transmission belt 2 excellent in durability.

Furthermore, in the metal ring production method according to the present embodiment, the different conditions (here, given or not given the nitride inhibition to the nitride layer portions 12a, 12b, 12c) to the first, the second, and the third nitride layer portions 12a, 12b, 12c are set to make the layer thicknesses Pc of the third nitride layer portions 12c smaller than the layer thicknesses Pa, Pb of the first and the second nitride layer portions 12a, 12b, thereby making it possible to suppress the decrease in margin of strength in the both widthwise end portions of the thin plate metal ring 11, and to efficiently produce the stacked body metal rings 10L, 10R and the power transmission belt 2 excellent in durability.

Second Embodiment

Figure 7:
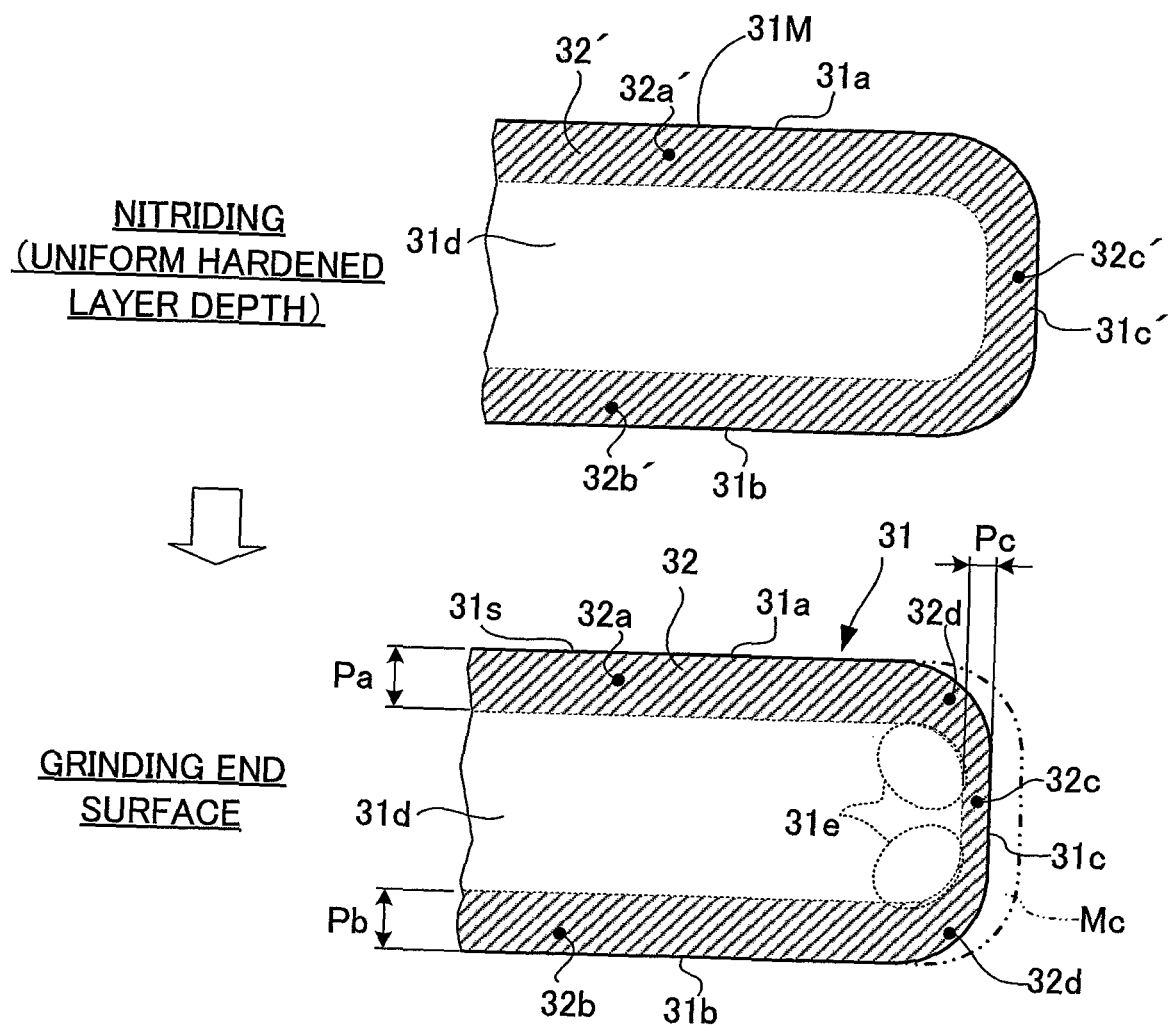
FIG. 7 is a process explanation view of a production method of a metal ring according to a second embodiment of the present invention.

FIG. 7 shows a metal ring and a method of producing the same according to a second embodiment of the present invention.

The present embodiment is similar in construction to the metal ring and the method of producing the same according to the first embodiment, so that the constitution elements and steps identical or similar to those of the first embodiment will be explained using the reference numerals of the elements shown in FIGS. 1 to 4, and omitting to show elements or parts other than the main portion of the second embodiment.

The thin plate metal rings 31 of the present embodiment shown in FIG. 7 are each formed in an endless band-like shape and, similarly to the thin plate metal ring 11 of the first embodiment, constitute a pair of stacked body metal rings 10L, 10R with the different kinds of thin plate metal rings 31 each having a respective circumferential length somewhat different from one another being stacked as a set in a nested state.

The thin plate metal ring 31 is made of, for example, maraging steel. As shown partly in enlarged cross section in FIG. 7, the thin plate metal ring 31 in an endless band-like shape has surface portions including an outer circumferential surface 31a, an inner circumferential surface 31b, both widthwise end surfaces 31c having respective nitride layers 32 formed therein and a non-nitride portion 31 on the inner side of the nitride layers 32. The nitride layers 32 are constituted by a first nitride layer portion 32a positioned at the outer circumferential surface 31a of the thin plate metal ring 31 in the form of the endless band-like body, a second nitride layer portion 32b positioned at the inner circumferential surface 31b of the thin plate metal ring 31, and third nitride layer portions 32c respectively positioned at the both widthwise end surfaces 31c (only one end portion shown in FIG. 7). The layer thicknesses Pc of the third nitride layer portions 32c are smaller than either one of the layer thicknesses Pa, Pb of the first and the second nitride layer portions 32a, 32b.

The nitride layer 32 of each of the thin plate metal rings 31 has four chamfered shape portions 32d having respective curved surfaces between the third nitride layer portion 32c and the first nitride layer portion 32a, and between the third nitride layer portion 32c and the second nitride layer portion 32b. The thickness Pc of the third nitride layer portion 32c is designed to be larger in the chamfered shape portion 32d as it is closer to either one of the first nitride layer portion 32a and the second nitride layer portion 32b. The radius of curvature of the surface of the chamfered shape portion 32d of the thin plate metal ring 31 is designed to be larger than the thicknesses Pa, Pb, Pc. The thin plate metal rings 31 have the first nitride layer portion 32a and the second nitride layer portion 32b having respective compression residual stresses larger than the compression residual stress of the third nitride layer portion 32c. The compression residual stress of the first nitride layer portion 32a positioned at the outer circumferential surface of the thin plate metal ring 31 is made larger by the compression residual stress of the second nitride layer portion 32b.

The production of the thin plate metal ring 31 is carried out through the steps similar to that of the first embodiment and includes a step of forming a material drum DM, a step of annealing the material DM, a step of severing the material drum DM into a plurality of material rings RM, a barrel polishing step, a step of rolling the material rings RM to form material rings 31M having a thin plate shape and a predetermined circumferential length, a step of conducting solution treatment to remove the rolling strain from the material rings 31M and to recrystallize the steel material, and a step of adjusting the circumferential length of each of the material rings 31M (these steps are corresponding to the steps from the drum forming to the circumferential length adjustment in FIG. 4).

The foregoing steps are the same as those of the production method according to the first embodiment previously mentioned. However, according to the present embodiment, there is no such a step of forming a nitride inhibition film on the material ring 31M after the step of adjusting the circumferential length of the material ring 31M. In the present embodiment, the material ring 31M is then gas nitrided by ammonia gas at a temperature close to an aging precipitation treatment temperature of the maraging steel to undergo an aging and nitride treatment, so that the material ring 31M can be formed with the nitride layer 32' even in thickness to ensure that the nitride layer portion 32c' formed at the both widthwise end portions of the material ring 31M is the same in thickness as the nitride layer portions 32a', 32b' formed at the central portion of the material ring 31M.

Then, after the step of conducting the nitride treatment to form the nitride layer 32' as mentioned above, the surface layer portions Mc of the both widthwise end portions of the material ring 31M are ground to ensure that the nitride layer portion 32c' formed at the both widthwise end portions of the material ring 31M is smaller in thickness than the nitride layer portions 32a', 32b' formed at the central portion of the material ring 31M. As a consequence, the nitride layer portion 32c formed at the both widthwise end portions of the material ring 31M has the thickness Pc smaller than the thicknesses Pa, Pb of the nitride layer portions 32a, 32b formed at the central portion of the material ring 31M, thereby adjusting the nitride layer 32 of the thin plate metal ring 31 to have a predetermined thickness. Here, when grinding the surface layer portions Mc of the nitride layer portion 32c' of the both widthwise end portions of the material ring 31M, the grinding brush 18 that is used for the mask removing step in the first embodiment and for the work of removing burr at the time of severing the material ring RM can be used.

Similarly, in the present embodiment, the thin plate metal rings 31 constituting the stacked body metal rings 10L, 10R are in the state that the closer it is to a surface 31s of the thin plate metal ring 31, the larger the compression residual stress generated in the circumferential direction is, while a tensile residual stress is generated by reaction at the corner portions 31e of the both widthwise end portions of the non-nitride portion 31d on the inner side of the nitride layer 32. This means that the corner portions 31e at the both widthwise end portions of the non-nitride portion 31d positioned near the third nitride layer portion 32c at the widthwise end portions of the thin plate metal ring 31 and near the first and the second nitride layer portions 32a, 32b of the thin plate metal ring 31 are likely to have a high tensile residual stress. However, the layer thickness Pc decreased of the third nitride layer portion 32c at the both widthwise end portions of the thin plate metal ring 31 can reduce the compression residual stress of the third nitride layer portion 32c while providing the both widthwise end portions of the thin plate metal ring 31 with a hardness sufficiently high to the degree of securing the wear resistance required strength with respect to the contact with the elements 15.

The tensile residual stress at the corner portions 31e of the both widthwise end portions of the non-nitride portion 31d positioned close to either one of the first nitride layer portion 32a and the second nitride layer portion 32b of the thin plate metal ring 31 and close to the third nitride layer portions 32c can be suppressed from being raised. It is therefore possible to suppress the decrease in margin of strength and the concentration of tensile stress in the both widthwise end portions of the thin plate metal ring 31, thereby making it possible to enhance the durability of the band-like stacked body metal rings 10L, 10R. As a consequence, the present embodiment makes it possible to provide the stacked body metal rings 10L, 10R and the power transmission belt 2 excellent in durability similarly to the first embodiment.

Furthermore, the metal ring production method according to the present embodiment is carried out through the same steps as those of the conventional method until the step of conducting the nitride treatment to the metal ring. However, in the present embodiment, the different conditions (given or not given the grinding of the surface layer portions Mc) to the nitride layers 32 after the nitride treatment are set to make the layer thicknesses Pc of the third nitride layer portions 32c smaller than the layer thicknesses Pa, Pb of the first and the second nitride layer portions 12a, 12b, thereby making it possible to suppress the decrease in margin of strength in the both widthwise end portions of the thin plate metal ring 31, and to efficiently produce the stacked body metal rings 10L, 10R and the power transmission belt 2 excellent in durability.

Third Embodiment

Figure 8A:
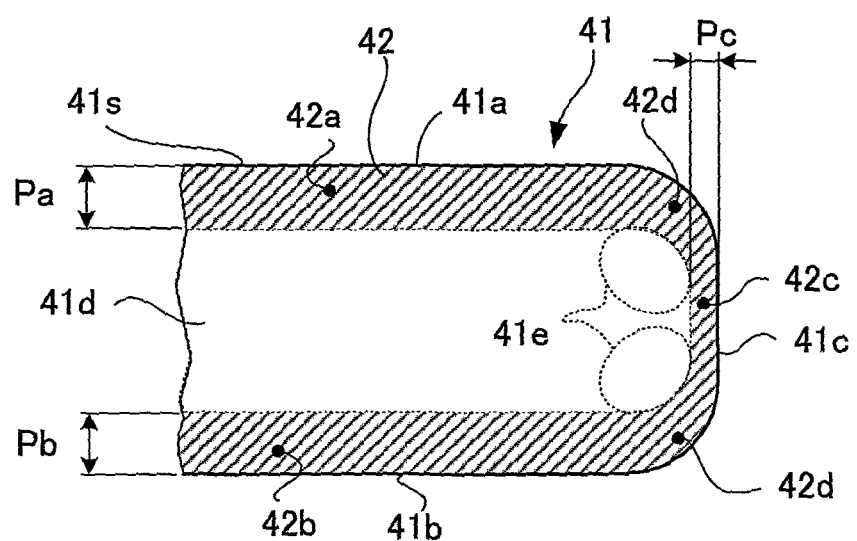
FIG. 8A is an enlarged fragmentary cross sectional view of an essential portion of a metal ring according to a third embodiment of the present invention.
Figure 8B:
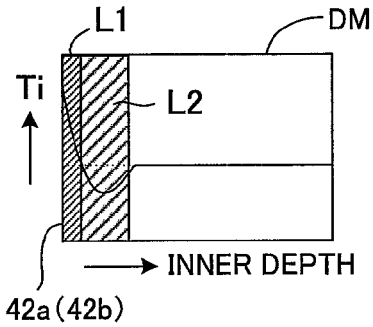
FIG. 8B is a process explanation view of a production method of the metal ring according to the third embodiment of the present invention.

FIG. 8 shows a metal ring and a method of producing the same according to a third embodiment of the present invention.

The metal ring according to the present embodiment is similar in construction to the metal ring according to the first and the second embodiments, so that the constitution elements and steps identical or similar to those of the first embodiment will be explained using the reference numerals of the elements shown in FIGS. 1 to 4, and omitting to show elements or parts other than the main portion of the third embodiment.

The thin plate metal rings 41 of the present embodiment shown in FIG. 8 are each formed in an endless band-like shape and, similarly to the thin plate metal ring 11 of the first embodiment or the thin plate metal ring 31 of the second embodiment, constitute a pair of stacked body metal rings 10L, 10R each with the different kinds of thin plate metal rings 41 having respective circumferential lengths somewhat different from one another being stacked as a set in a nested state.

The thin plate metal ring 41 is made of, for example, maraging steel. As shown partly in enlarged cross section in FIG. 8A, the thin plate metal ring 41 in an endless band-like shape has surface portions including an outer circumferential surface 41a, an inner circumferential surface 41b, and both widthwise end surfaces 41c having respective nitride layers 42 formed therein and a non-nitride portion 41d on the inner side of the nitride layers 42. The nitride layers 42 are each constituted by a first nitride layer portion 42a positioned at the outer circumferential surface 41a of the thin plate metal ring 41 in the form of the endless band-like body, a second nitride layer portion 42b positioned at the inner circumferential surface 41b of the thin plate metal ring 41, and third nitride layer portions 42c respectively positioned at the both widthwise end surfaces 41c (only one end portion shown in FIG. 8A). The layer thicknesses Pc of the third nitride layer portions 42c are smaller than any one of the layer thicknesses Pa, Pb of the first and the second nitride layer portions 42a, 42b.

The nitride layer 42 of each of the thin plate metal rings 41 has four chamfered shape portions 42d having respective curved surfaces between the third nitride layer portion 42c and the first nitride layer portion 42a, and between the third nitride layer portion 42c and the second nitride layer portion 42b. The thickness Pc of the third nitride layer portion 42c is designed to be larger in the chamfered shape portion 42d as it is closer to either one of the first nitride layer portion 42a and the second nitride layer portion 42b. The radius of curvature of the surface of the chamfered shape portion 42d of the thin plate metal ring 41 is designed to be larger than the thicknesses Pa, Pb, Pc. The thin plate metal rings 41 have the first nitride layer portion 42a and the second nitride layer portion 42b having respective compression residual stresses larger than the compression residual stress of the third nitride layer portion 42c. The compression residual stress of the first nitride layer portion 42a positioned at the outer circumferential surface of the thin plate metal ring 41 is made larger by the compression residual stress of the second nitride layer portion 42b.

The production of the thin plate metal ring 41 is carried out with the step of forming a material drum DM similarly to that of the first embodiment, but with other steps different from those of the first and the second embodiments.

The production of the thin plate metal ring according to the present embodiment is characterized by the steps including a nitride inhibitor production step of producing nitride inhibitor having concentration relatively high at the both widthwise end portions of the material ring 41M compared with that at the central portion of the material ring 41M, and a nitriding step of conducting a nitride treatment to the material ring 41M after the nitride inhibitor production step to form the third nitride layer portions 42c at the both widthwise end portions of the material ring 41M and the first and the second nitride layer portions 42a, 42b at the central portion of the material ring 41M.

More concretely, these steps are executed by preparing a material drum DM of a cylindrical body made of maraging steel (steel material) including a specific strengthening element such as Ti that effects nitride inhibition when oxidized (preparing step), and then executing an annealing step of heating the material drum DM to its annealing temperature similarly to the first embodiment to produce a concentration layer L1 adjacent to the surface of the material drum DM having an oxide of the strengthening element Ti higher in concentration than the remaining portions of the material drum DM and an absentee layer L2 positioned below the concentration layer L1 to have the oxide of the strengthening element Ti lower than the steel material.

After the above steps, executed are a severing step in a similar manner to the first embodiment and a barrel polishing step (concentration layer removal step) following the severing step, the severing step being of severing the material drum DM to have a predetermined widthwise dimension to form a material ring RM after the previous annealing step, and the barrel polishing step being of polishing the outer and the inner surface portions of the material ring RM with at least part of the absentee layer L2 being left to have a predetermined layer thickness to from the outer and the inner surface portions of the material ring RM and with the concentration layer L1 being removed.

After the material ring RM is then rolled to form a material ring 41M of a thin plate after the barrel polishing step, executed are a solution treatment of removing the rolling strain of the material ring 41M to recrystallize the steel material, and a circumferential length adjustment to the material ring 41M (corresponding to the steps of the rolling, solution treatment, and the circumferential length adjustment).

An oxidization treatment is then executed to have the surface of the material ring 41M oxidized in such a manner to form an oxidized film L3a by oxidizing a part or the whole of the absentee layer L2 at the widthwise central portion of the material ring 41M, and an oxidized film L3c by oxidizing the maraging steel material at the both widthwise end portions of the material ring 41M. The oxidized film L3a with a part or the whole of the absentee layer L2 being oxidized functions to exercise a catalysis action to promote nitride in the nitride treatment as hereinafter described, while the oxidized film L3c with the maraging steel material being oxidized inversely functions to exercise the action of a nitride inhibitor to inhibit the nitriding.

Then, a nitride treatment step of gas nitride treatment using temperature and gas in a similar manner to the first embodiment is executed in the state (see the material ring 41M in the step of the oxidization treatment in FIG. 8) that the widthwise central portion and the both widthwise end portions of the material ring 41M after the oxidization treatment are different from each other in concentration of Ti oxide serving as a nitride inhibitor.

At this time, the catalysis action is exercised at the widthwise central portion of the material ring 41M by the oxidized film L3a to promote nitriding, while the nitride inhibiting action is exercised at the both widthwise end portions of the material ring 41M by the oxidized film L3c containing a high concentration of the Ti oxide serving as a nitride inhibitor to inhibit the nitriding. This leads to the fact that the widthwise central portion and the both widthwise end portions of the material ring 41M are different from each other in the hardened layer depth of the nitride layer 42, thereby producing a third nitride layer portion 42c having a small layer thickness Pc at the both widthwise end portions, and the first and the second nitride layer portions 42a, 42b respectively having large layer thicknesses Pa, Pb at the widthwise central portion.

Similarly, in the present embodiment, the thin plate metal rings 41 constituting the stacked body metal rings 10L, 10R are in the state that the closer it is to the surface 41s of the thin plate metal ring 41, the larger the compression residual stress generated in the circumferential direction is, while a tensile residual stress is generated by reaction at the corner portions 41e of the both widthwise end portions of the non-nitride portion 41d on the inner side of the nitride layer 42. This means that the corner portions 41e at the both widthwise end portions of the non-nitride portion 41d positioned near the third nitride layer portion 42c at the widthwise end portions of the thin plate metal ring 41 and near the first and the second nitride layer portions 42a, 42b of the thin plate metal ring 41 are likely to have a high tensile residual stress. However, the layer thickness Pc decreased of the third nitride layer portion 42c at the both widthwise end portions of the thin plate metal ring 41 can decrease the compression residual stress of the third nitride layer portion 42c while providing the both widthwise end portions of the thin plate metal ring 41 with a hardness sufficiently high to the degree of securing the wear resistance required strength with respect to the contact with the elements 15.

The tensile residual stress at the corner portions 41e of the both widthwise end portions of the non-nitride portion 41d close to either one of the first nitride layer portion 42a and the second nitride layer portion 42b can be suppressed from being raised. It is therefore possible to suppress the decrease in margin of strength and the concentration of tensile residual stress in the both widthwise end portions of the thin plate metal ring 41. As a consequence, the present embodiment makes it possible to provide the stacked body metal rings 10L, 10R and the power transmission belt 2 excellent in durability similarly to the first embodiment.

Prior to the nitriding step in the metal ring production method of the present embodiment, the steps of annealing, barrel polishing, oxidization treatment are executed to have the widthwise central portion and the both widthwise end portions of the material ring 41M different in concentration of the Ti oxide serving as a nitride inhibitor, thereby making difference in nitriding degree between the widthwise central portion and the both widthwise end portions of the material ring 41M, so that the nitride layer 42 at each of the both widthwise end portions of the material ring 41M can have a small thickness, while the nitride layer 42 at the widthwise central portion of the material ring 41M can have a large thickness. It is therefore possible to reliably suppress the decrease in margin of strength and the concentration of tensile residual stress in the both widthwise end portions of the stacked body metal rings 10L, 10R.

The concentration layer L1 and the absentee layer L2 formed in the annealing step exist on the outer and the inner circumferential surfaces of the material ring RM immediately after severed from the material drum DM in the severing step. However, when the concentration layer L1 is removed in the concentration layer removal step with a part or the whole of the absentee layer L2 being left, after the concentration layer removal step, there exists the absentee layer L2' at the widthwise central portion of the material ring 41M, while no absentee layer L2' exists at the both widthwise end portions of the material ring 41M. In the oxidization step, the Ti oxide serving to exercise the nitride inhibiting action is formed at the both widthwise end portions of the material ring 41M to have a high concentration, while the Ti oxide is not formed at the both surfaces of the widthwise central portion of the material ring 41M, and thus remains in an absent state of Ti oxide. This means that there is caused a difference in nitriding degree between the widthwise central portion and the both widthwise end portions of the material ring 41M, so that the nitride layer 42 (third nitride layer portion 42c) becomes thin in thickness at the both widthwise end portions of the material ring 41M, while the nitride layer 42 (first and second nitride layer portions 42a, 42b) becomes thick in thickness at the widthwise central portion of the material ring 41M. Therefore, the present embodiment is not greatly different from the conventional production method except for the fact that the removal depth in the concentration layer removal step is adjusted to have the absentee layer L2' left, and the Ti oxide serving to exercise the nitride inhibiting action is produced only at the both widthwise end portions of the material ring 41M before the nitriding step. It is therefore possible to efficiently produce the stacked body metal rings 10L, 10R and the power transmission belt 2 excellent in durability.

Fourth Embodiment

Figure 9:
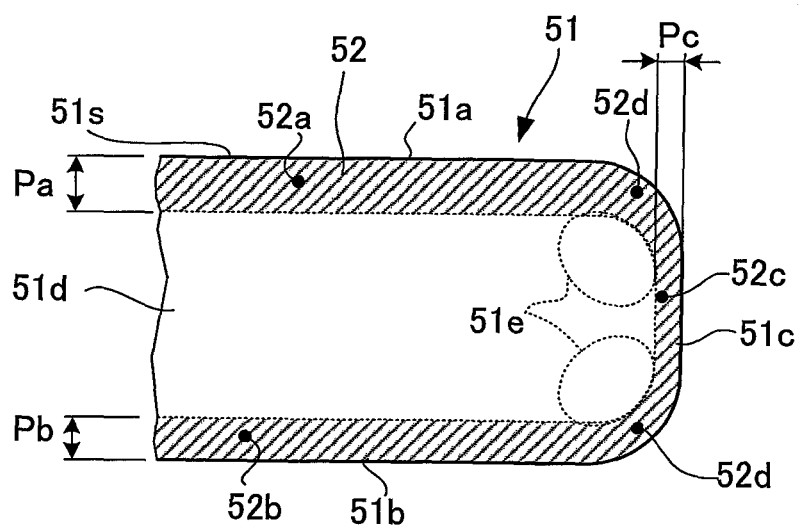
FIG. 9 is an enlarged fragmentary cross sectional view of an essential portion of a metal ring according to a fourth embodiment of the present invention.
Figure 10:
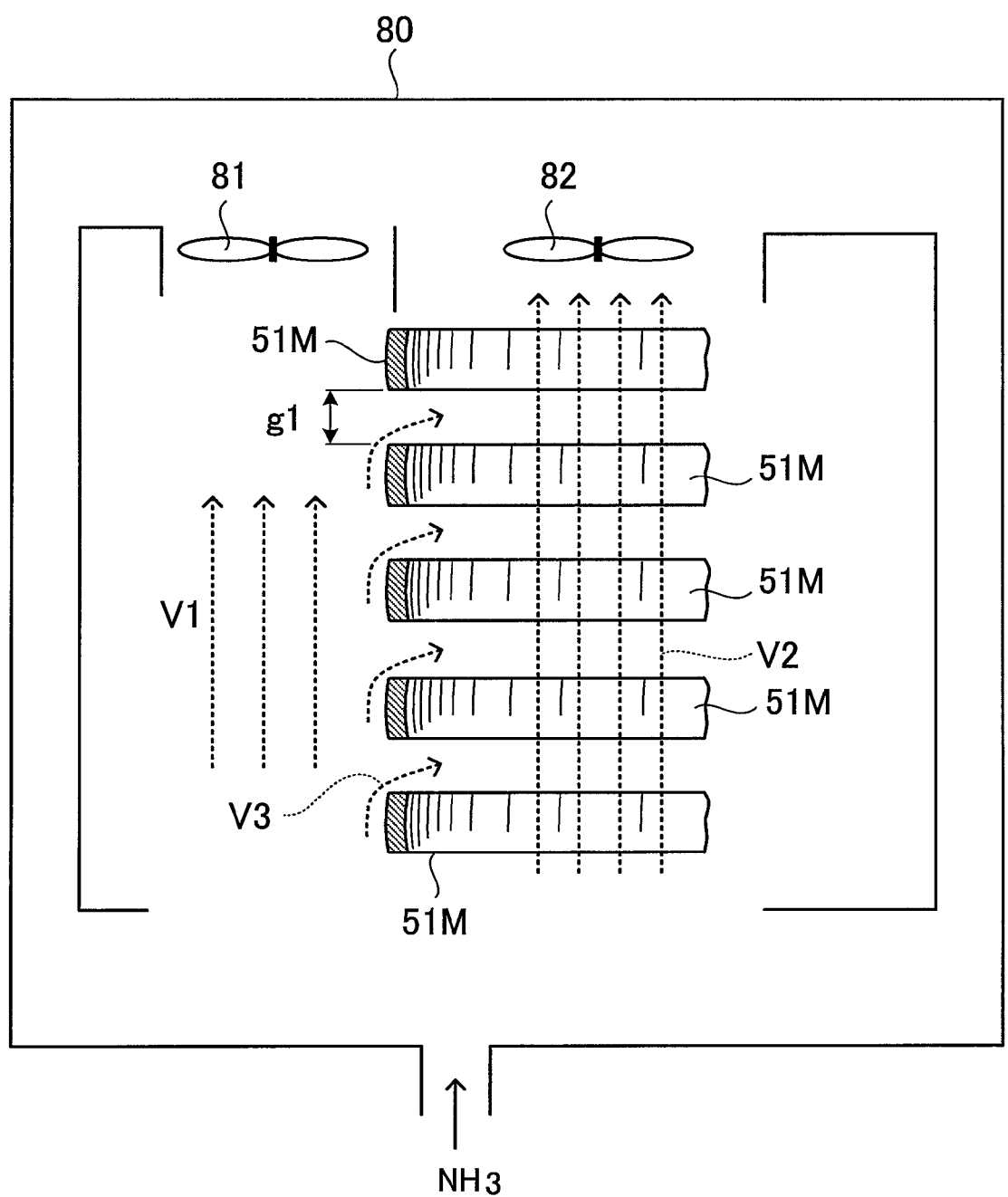
FIG. 10 is a process explanation view of a production method of the metal ring according to the fourth embodiment of the present invention.

FIGS. 9 and 10 show a metal ring and a method of producing the same according to a fourth embodiment of the present invention. The present embodiment is similar in construction and steps to the metal ring and to the method of producing the same according to the first embodiment, so that the constitution elements and steps identical or similar to those of the first embodiment will be explained using the reference numerals of the elements shown in FIGS. 1 to 4, and omitting to show elements or parts other than the main portion of the fourth embodiment.

The thin plate metal rings 51 of the present embodiment shown in FIG. 9 are each formed in an endless band-like shape and, similarly to the thin plate metal ring 11 of the first embodiment, constitute a pair of stacked body metal rings 10L, 10R each with different kinds of metal rings 51 having respective circumferential lengths somewhat different from one another being stacked as a set in a nested state.

The thin plate metal ring 51 is made of, for example, maraging steel. As shown partly in enlarged cross section in FIG. 9, the thin plate metal ring 51 in an endless band-like shape has surface portions including an outer circumferential surface 51a, an inner circumferential surface 51b, and both widthwise end surfaces 51c having respective nitride layers 52 formed therein and a non-nitride portion 51d on the inner side of the nitride layers 52. The nitride layers 52 are each constituted by a first nitride layer portion 52a positioned at the outer circumferential surface 51a of the thin plate metal ring 51 in the form of the endless band-like body, a second nitride layer portion 52b positioned at the inner circumferential surface 51b of the thin plate metal ring 51, and third nitride layer portions 52c respectively positioned at the both widthwise end surfaces 51c (only one end portion shown in FIG. 9). The layer thicknesses Pc of the third nitride layer portions 52c are smaller than any one of the layer thicknesses Pa, Pb of the first and the second nitride layer portions 52a, 52b.

The nitride layer 52 of each of the thin plate metal rings 51 has four chamfered shape portions 52d having respective curved surfaces between the third nitride layer portion 52c and the first nitride layer portion 52a, and between the third nitride layer portion 52c and the second nitride layer portion 52b. The thickness Pc of the third nitride layer portion 52c is designed to be larger in the chamfered shape portion 52d as it is closer to either one of the first nitride layer portion 52a and the second nitride layer portion 52b. The radius of curvature of the surface of the chamfered shape portion 52d of the thin plate metal ring 51 is designed to be larger than the thicknesses Pa, Pb, Pc. The thin plate metal rings 51 have the first nitride layer portion 52a and the second nitride layer portion 52b having respective compression residual stresses larger than the compression residual stress of the third nitride layer portion 52c. The compression residual stress of the first nitride layer portion 52a positioned at the outer circumferential surface side of the thin plate metal ring 51 is made larger by the compression residual stress of the second nitride layer portion 52b.

The production of the thin plate metal ring 51 is carried out through the steps similar to that of the first embodiment and includes a step of forming a material drum DM, a step of annealing the material DM, a step of severing the material drum DM into a plurality of material rings RM, a barrel polishing step, a step of rolling the material rings RM to form material rings 51M having a thin plate shape and a predetermined circumferential length, a step of conducting solution treatment to remove the rolling strain from the material rings and to recrystallize the steel material, and a step of adjusting the circumferential length of each of the material rings 51M (these steps are corresponding to the steps from the drum forming to the circumferential length adjustment in FIG. 4). The previous steps are the same as those of the production method according to the first embodiment.

In the present embodiment, there is no such a step of forming a nitride inhibition film on the material ring 51M after the step of adjusting the circumferential length of the material ring 51M, but the material ring 51M is then gas nitrided by ammonia gas at a temperature close to an aging precipitation treatment temperature of the maraging steel. Regarding this point, the present embodiment is the same as the second embodiment, but in the production method of the present embodiment, the nitride treatment conditions at the both widthwise end portions and the widthwise central portion of the material ring 51M are different from each other.

As shown in FIG. 10, the metal ring production method according to the present embodiment includes an arrangement step of arranging the plurality of material rings 51M to be spaced apart from one another with a space gap g1 in the width directions of the material rings 51M before its nitride treatment, a first gas flow step of flowing gas from one side of the material ring 51M in the widthwise direction to the other side of the material ring 51M in the widthwise direction in such a manner that the gas flow speeds V1, V2 of ammonia gas for nitride treatment at the outer and the inner circumferential sides of the material ring 51M are different from each other, and the gas flow speed V1 at the outer circumferential side of the material ring 51M is smaller than the gas flow speed V2 at the inner circumferential side of the material ring 51M (V1<V2), and a second gas flow step of flowing gas between the material rings 51M spaced apart from one another in the width direction of the material rings 51M from the one circumferential side of the material ring 51M to the other circumferential side of the material ring 51M as shown by arrows V3 (hereinafter called a flow speed V3) in FIG. 10. Though not stated in detail about the method of supporting the material rings 51M in the arrangement step, the material rings 51M can be supported with a predetermined space therebetween, for example, by a plurality of supporting projections upwardly spaced apart from one another and projecting from a plurality of upstanding poles provided around the arranging space of the material rings 51M, or by a plurality of spacers vertically slidably engaged with a plurality of upstanding poles and each arranged between the neighboring two material rings 51M (for example, each having two conical surfaces coupled with each other).

The means for making the gas flow speeds V1, V2 at the outer and the inner circumferential sides of the material ring 51M different from each other is constituted by two kinds of fans 81, 82 arranged in a gas nitride tank 80 to make the gas flow speeds V1, V2 at the outer and the inner circumferential sides of the material ring 51M different from each other. The fans 81, 82 are shown in FIG. 10 as being arranged, for example, downstream of the plurality of material rings 51M.

In this case, the gas flow speeds V1, V2 are made different from each other at the outer and inner circumferential sides of the material ring 51M. However, the nitriding ammonia gas can flow between the material rings 51M from the one circumferential side of the material ring 51M to the other circumferential side of the material ring 51M, for example, from the outer circumferential side of the material ring 51M to the inner circumferential side of the material ring 51M as shown in FIG. 10. The gas flow states can be adjusted in such a manner that the gas flow speeds (wind speed) near the surface of the material ring 51M, i.e., a work, are different at the outer circumferential surface 51a side, the inner circumferential surface 51a side, and the both widthwise end surfaces 51c sides of the material ring 51M as shown in FIG. 11.

Figure 11:
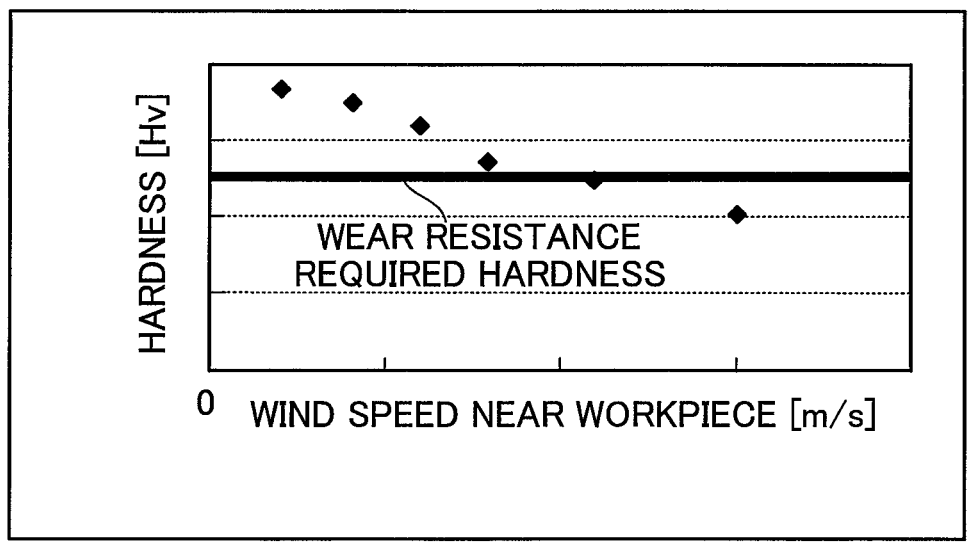
FIG. 11 is an operation explanation view of a production method of the metal ring according to the fourth embodiment of the present invention.

Meanwhile, in the case of the gas nitride treatment, a large wind speed near the surface of the work tends to make shallow the hardened layer treated by the gas nitriding as indicated in FIG. 11 and thus, an increased wind speed near the surface of the work tends to result in decreased hardness (Hv) of the surface of the work.

The gas flow speeds V1, V2 at the outer circumferential surface 51a side, the inner circumferential surface 51a side, and the both widthwise end surfaces 51c sides of the material ring 51M are varied by the adjustment of the exhaust/blow power (e.g., rotation speed) of the fans 81, 82, or otherwise the space gap g1 in the width direction of the material ring 51M is adjusted to have the gas flow speed V3 varied, so that the layer thicknesses Pa, Pb, Pc of the first, the second, and the third nitride layer portions 52a, 52b, 52c constituting the nitride layer 52 can be adjusted.

Accordingly, the one side of the inner and the outer circumferential surfaces of the material ring 51M near the concentration point of the stress of the fatigue endurance is exemplified by the first nitride layer portion 52a which can be made to have a large layer thickness Pa to raise the residual compression stress, while the third layer portion 52c can be made to have a layer thickness Pc smaller than the thickness Pa of the first layer portion 52a and the thickness Pb of the second layer portion 52b.

Similarly, in the present embodiment, the thin plate metal rings 51 constituting the stacked body metal rings 10L, 10R are in the state that the closer it is to the surface 51s of the thin plate metal ring 51, the larger the compression residual stress generated in the circumferential direction is, while a tensile residual stress is generated by reaction at the corner portions 51e of the both widthwise end portions of the non-nitride portion 51d on the inner side of the nitride layer 52. This means that the corner portions 51e at the both widthwise end portions of the non-nitride portion 51d positioned near the third nitride layer portion 52c at the widthwise end portions of the thin plate metal ring 51 and near the first and the second nitride layer portions 52a, 52b of the thin plate metal ring 51 are likely to have a high tensile residual stress. However, the layer thickness Pc decreased of the third nitride layer portion 52c at the both widthwise end portions of the thin plate metal ring 51 can decrease the compression residual stress of the third nitride layer portion 52c while providing the both widthwise end portions of the thin plate metal ring 51 with a hardness sufficiently high to the degree of securing the wear resistance required strength with respect to the contact with the elements 15.

The tensile residual stress at the corner portions 51e of the both widthwise end portions of the non-nitride portion 51d close to any one of the first nitride layer portion 52a and the second nitride layer portion 52b can be suppressed from being raised. It is therefore possible to suppress the decrease in margin of strength and the concentration of tensile stress in the both widthwise end portions of the thin plate metal ring 51, thereby making it possible to enhance the durability of the band-like stacked body metal rings 10L, 10R. As a consequence, the present embodiment makes it possible to provide the stacked body metal rings 10L, 10R and the power transmission belt 2 excellent in durability similarly to the first embodiment.

Furthermore, the metal ring production method according to the present embodiment is carried out through the same steps as those of the conventional method until the step of conducting the nitride treatment to the metal ring. However, in the present embodiment, the gas flow speeds (nitride treatment conditions) are made different at the time of nitride treatment to ensure that the first, the second, and the third nitride layer portions 52a, 52b, 52c are set to make the layer thicknesses Pc of the third nitride layer portions 52c smaller than the layer thicknesses Pa, Pb of the first and the second nitride layer portions 12a, 12b, thereby resulting in no need to use a special means for varying the gas speed V3 between the material rings 51M, and thereby making it possible to suppress the decrease in margin of strength in the both widthwise end portions of the thin plate metal ring 51, and to efficiently produce the stacked body metal rings 10L, 10R and the power transmission belt 2 excellent in durability.

Fifth Embodiment

Figure 12:
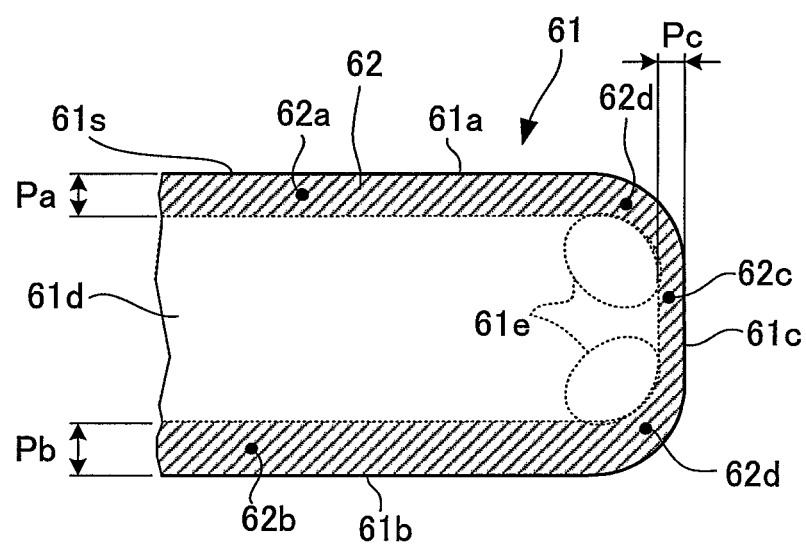
FIG. 12 is an enlarged fragmentary cross sectional view of an essential portion of a metal ring according to a fifth embodiment of the present invention.
Figure 13:
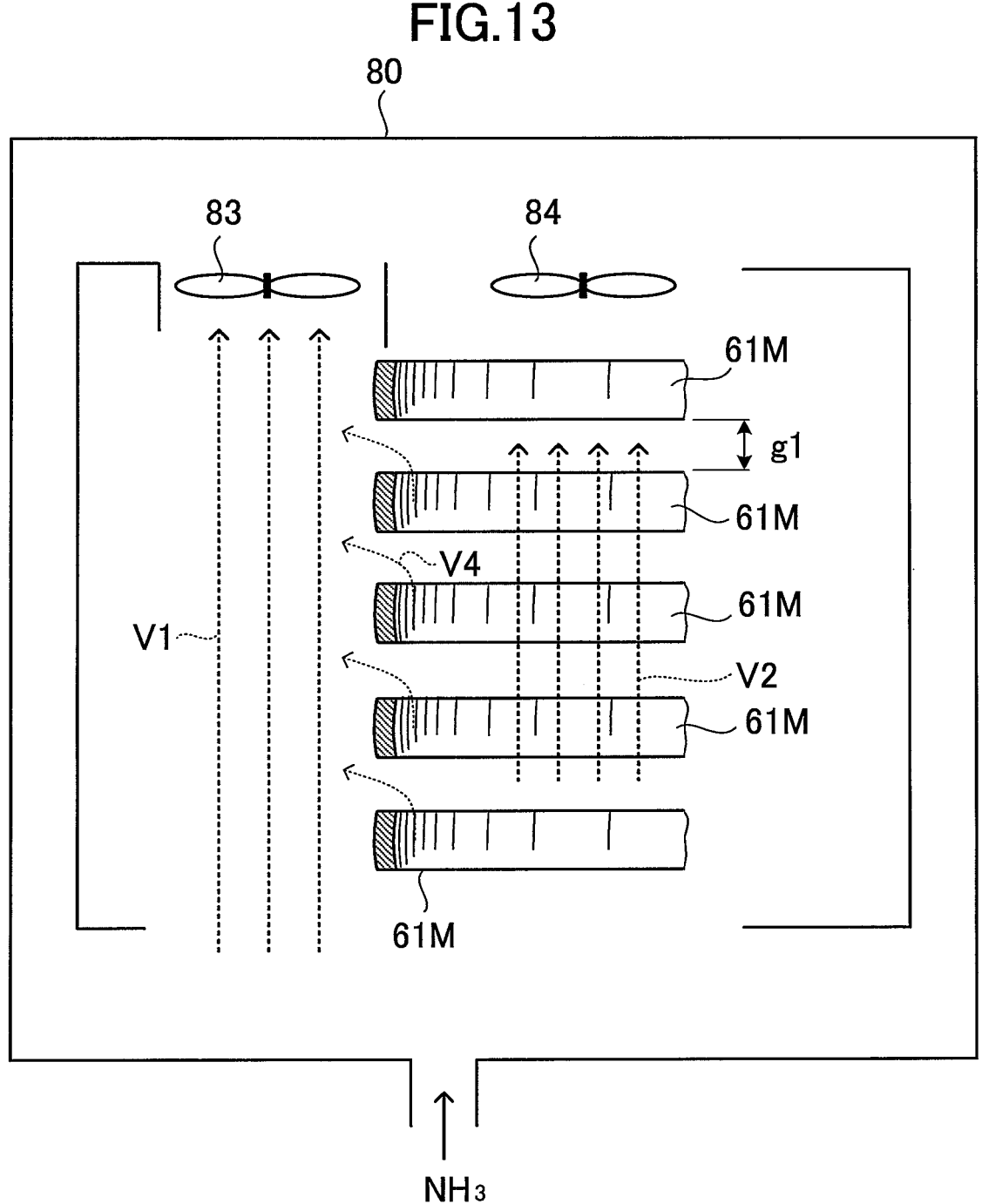
FIG. 13 is a process explanation view of a production method of the metal ring according to the fifth embodiment of the present invention.

FIGS. 12 and 13 show a metal ring and a method of producing the same according to a fifth embodiment of the present invention. The present embodiment is similar in construction and steps to the metal rings and to the methods of producing the same according to the first and the fourth embodiments, so that the constitution elements and steps identical or similar to those of the first and the fourth embodiments will be explained using the reference numerals of the elements shown in FIGS. 1 to 4 and FIGS. 9 and 10, and omitting to show elements or parts other than the main portion of the fifth embodiment.

The thin plate metal rings 61 of the present embodiment shown in FIG. 12 are each formed in an endless band-like shape and, similarly to the thin plate metal ring 11 of the first embodiment, constitute a pair of stacked body metal rings 10L, 10R each with the different kinds of metal rings 61 having respective circumferential lengths somewhat different from one another being stacked as a set in a nested state.

The thin plate metal ring 61 is made of, for example, maraging steel. As shown partly in enlarged cross section in FIG. 12, the thin plate metal ring 61 in an endless band-like shape has surface portions including an outer circumferential surface 61a, an inner circumferential surface 61b, and both widthwise end surfaces 61c having respective nitride layers 62 formed therein and a non-nitride portion 61d on the inner side of the nitride layers 62. The nitride layers 62 are each constituted by a first nitride layer portion 62a positioned at the outer circumferential surface 61a of the thin plate metal ring 61 in the form of the endless band-like body, a second nitride layer portion 62b positioned at the inner circumferential surface 61b of the thin plate metal ring 61, and third nitride layer portions 62c respectively positioned at the both widthwise end surfaces 61c (only one end portion shown in FIG. 12). The layer thicknesses Pc of the third nitride layer portions 62c are smaller than any one of the layer thicknesses Pa, Pb of the first and the second nitride layer portions 62a, 62b.

The nitride layer 62 of each of the thin plate metal rings 61 has four chamfered shape portions 62d having respective curved surfaces between the third nitride layer portion 62c and the first nitride layer portion 62a, and between the third nitride layer portion 62c and the second nitride layer portion 62b. The thickness Pc of the third nitride layer portion 62c is designed to be larger in the chamfered shape portion 62d as it is closer to either one of the first nitride layer portion 62a and the second nitride layer portion 62b. The radius of curvature of the surface of the chamfered shape portion 62d of the thin plate metal ring 61 is designed to be larger than the thicknesses Pa, Pb, Pc. The thin plate metal rings 61 have the first nitride layer portion 62a and the second nitride layer portion 62b having respective compression residual stresses larger than the compression residual stress of the third nitride layer portion 62c.

The compression residual stress of the first nitride layer portion 62a positioned at the outer circumferential surface side of the thin plate metal ring 61 is made smaller by the compression residual stress of the second nitride layer portion 62b.

The production of the thin plate metal ring 61 is carried out through the steps similar to that of the first embodiment and includes a step of forming a material drum DM, a step of annealing the material DM, a step of severing the material drum DM into a plurality of material rings RM, a barrel polishing step, a step of rolling the material rings RM to form material rings 61M having a thin plate shape and a predetermined circumferential length, a step of conducting solution treatment to remove the rolling strain from the material rings and to recrystallize the steel material, and a step of adjusting the circumferential length of each of the material rings 61M (these steps are corresponding to the steps from the drum forming to the circumferential length adjustment in FIG. 4). The previous steps are the same as those of the production method according to the first embodiment.

In the present embodiment, there is no such a step of forming a nitride inhibition film on the material ring 61M after the step of adjusting the circumferential length of the material ring 61M, but the material ring 61M is then gas nitrided by ammonia gas at a temperature close to an aging precipitation treatment temperature of the maraging steel. Regarding this point, the present embodiment is the same as the second embodiment.

In the present embodiment, the nitride treatment conditions at the both widthwise end portions and the widthwise central portion of the material ring 61M are different from each other. Regarding this point, the present embodiment is the same as the fourth embodiment, but the production method of the present embodiment is different from that of the fourth embodiment as follows.

As shown in FIG. 13, the metal ring production method according to the present embodiment includes an arrangement step of arranging the plurality of material rings 61M to be spaced apart from one another with a space gap g1 in the width direction of the material rings 61M before its nitride treatment, a first gas flow step of flowing gas from the one side of the material ring 61M in the widthwise direction to the other side of the material ring 61M in the widthwise direction in such a manner that the gas flow speeds V1, V2 of ammonia gas for nitride treatment at the outer and the inner circumferential surfaces of the material ring 61M are different from each other, and the gas flow speed V1 at the outer circumferential surface of the material ring 61M is larger than the gas flow speed V2 at the inner circumferential surface of the material ring 61M (V1>V2), and a second gas flow step of flowing gas between the material rings 61M spaced apart from one another in the width direction of the material rings 61M from the one circumferential side of the material ring 61M to the other circumferential side of the material ring 61M as shown by arrows V4 (hereinafter called a flow speed V4) in FIG. 13.

Here, the means for making the gas flow speeds V1, V2 at the outer and the inner circumferential surfaces of the material ring 61M different from each other is constituted by two kinds of fans 83, 84 arranged in the gas nitride tank 80 to make the gas flow speeds V1, V2 at the outer and the inner circumferential surfaces of the material ring 61M different from each other. The fans 83, 84 are shown in FIG. 13 as being arranged, for example, downstream of the plurality of material rings 61M.

In this case, the gas flow speeds V1, V2 are made different from each other at the outer and the inner circumferential surfaces of the material ring 61M. However, the nitriding ammonia gas can flow between the material rings 61M from the one circumferential side of the material ring 61M to the other circumferential side of the material ring 61M, for example, from the outer circumferential side of the material ring 61M to the inner circumferential side of the material ring 61M as shown in FIG. 13. The gas flow states can be adjusted in such a manner that the gas flow speeds (wind speed) near the surface of the material ring 61M, i.e., a work, are different at the outer circumferential surface 61a, the inner circumferential surface 61b, and the both widthwise end surfaces of the material ring 61M.

Meanwhile, as previously mentioned regarding the fourth embodiment, in the case of the gas nitride treatment, a large wind speed near the surface of the work tends to make shallow the hardened layer treated by the gas nitriding and thus, an increased wind speed near the surface of the work tends to result in the decreased hardness (Hv) of the surface of the work. The gas flow speeds V1, V2 at the outer circumferential surface 61a, the inner circumferential surface 61b, and the both widthwise end surfaces 61c of the material ring 61M are varied by the adjustment of the exhaust/blow power (e.g., rotation speed) of the fans 83, 84, or otherwise the space gap g1 in the width direction of the material ring 61M is adjusted to have the gas flow speed V4 varied, so that the layer thicknesses Pa, Pb, Pc of the first, the second, and the third nitride layer portions 62a, 62b, 62c constituting the nitride layer 62 can be adjusted.

It is therefore possible to make the layer thickness Pb of the second nitride layer portion 62b large at the inner circumferential surface 61b of the material ring 61M near the contact point with the elements 15 constituting the power transmission belt 2 of the continuously variable transmission 1 to enhance the durability thereof and to produce the third nitride layer portion 62c having the layer thickness Pc smaller than any one of the layer thickness Pa of the first nitride layer portion 62a and the layer thickness Pb of the second nitride layer portion 62b.

Similarly, in the present embodiment, the thin plate metal rings 61 constituting the stacked body metal rings 10L, 10R are in the state that the closer it is to the surface 61s of the thin plate metal ring 61, the larger the compression residual stress generated in the circumferential direction is, while a tensile residual stress is generated by reaction at the corner portions 61e of the both widthwise end portions of the non-nitride portion 61d on the inner side of the nitride layer 62. This means that the corner portions 61e at the both widthwise end portions of the non-nitride portion 61d positioned near the third nitride layer portion 62c at the both widthwise end portions of the thin plate metal ring 61 and near the first and the second nitride layer portions 62a, 62b of the thin plate metal ring 61 are likely to have a high tensile residual stress. However, the layer thickness Pc decreased of the third nitride layer portion 62c at the both widthwise end portions of the thin plate metal ring 61 can decrease the compression residual stress of the third nitride layer portion 62c while providing the both widthwise end portions of the thin plate metal ring 61 with a hardness sufficiently high to the degree of securing the wear resistance required strength with respect to the contact with the elements 15.

The tensile residual stress at the corner portions 61e of the both widthwise end portions of the non-nitride portion 61d close to any one of the first nitride layer portion 62a and the second nitride layer portion 62b can be suppressed from being raised. It is therefore possible to suppress the decrease in margin of strength and the concentration of tensile stress in the both widthwise end portions of the thin plate metal ring 11, thereby making it possible to enhance the durability of the band-like stacked body metal rings 10L, 10R. As a consequence, the present embodiment makes it possible to provide the stacked body metal rings 10L, 10R and the power transmission belt 2 excellent in durability similarly to the first embodiment.

Furthermore, the metal ring production method according to the present embodiment, as the same as the fourth embodiment, is carried out through the same steps as those of the conventional method until the step of conducting the nitride treatment to the metal ring. However, in the present embodiment, the gas flow speeds (nitride treatment conditions) are made different at the time of nitride treatment to ensure that the first, the second, and the third nitride layer portions 62a, 62b, 62c are set to make the layer thicknesses Pc of the third nitride layer portions 62c smaller than the layer thicknesses Pa, Pb of the first and the second nitride layer portions 12a, 12b, thereby making it possible to suppress the decrease in margin of strength in the both widthwise end portions of the thin plate metal ring 61, and to efficiently produce the stacked body metal rings 10L, 10R and the power transmission belt 2 excellent in durability.

Sixth Embodiment

Figure 14:
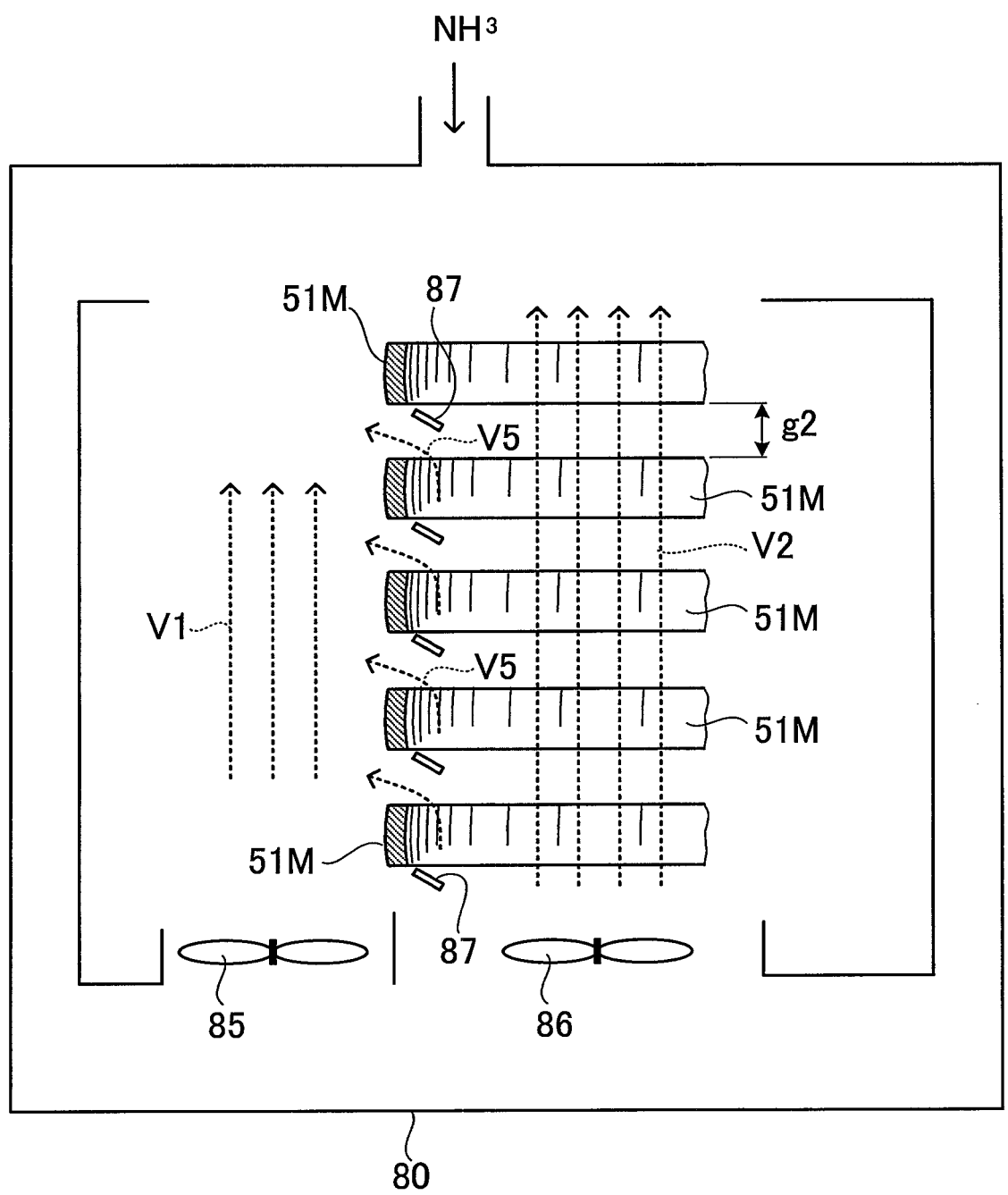
FIG. 14 is a process explanation view of a production method of a metal ring according to a sixth embodiment of the present invention.

FIG. 14 shows a method of producing a metal ring according to a sixth embodiment of the present invention.

The metal ring produced by the production method according to the present embodiment is the same as the thin plate metal ring 51 of the fourth embodiment, so that the following description will be directed to the nitride treatment using the material ring 51M in the fourth embodiment, and thus to the points different from those of the fourth embodiment.

The metal ring production method according to the present embodiment includes an arrangement step of arranging the plurality of material rings 51M to be spaced apart from one another with a space gap g2 in the width directions of the material rings 51M before its nitride treatment, a first gas flow step of flowing ammonia gas for nitride treatment from the one side of the material ring 51M in the widthwise direction to the other side of the material ring 51M in the widthwise direction in such a manner that the gas flow speeds V1, V2 at the outer and the inner circumferential surfaces of the material ring 51M are different from each other, and the gas flow speed V1 at the outer circumferential surface of the material ring 51M is smaller than the gas flow speed V2 at the inner circumferential surface of the material ring 51M (V1<V2), and a second gas flow step of flowing gas between the material rings 51M spaced apart from one another in the width directions of the material rings 51M from the one circumferential side of the material ring 51M to the other circumferential side of the material ring 51M as shown by arrows V5 (hereinafter called a flow speed V5) in FIG. 14.

Here, the means for making the gas flow speeds V1, V2 at the outer and the inner circumferential surfaces of the material ring 51M different from each other is constituted by two kinds of fans 85, 86 arranged in the gas nitride tank 80 to make the gas flow speeds V1, V2 at the outer and the inner circumferential surfaces of the material ring 51M different from each other. The fans 85, 86 are shown in FIG. 14 as being arranged, for example, upstream of the plurality of material rings 51M.

In this case, the gas flow speeds V1, V2 are made different from each other at the outer and the inner circumferential surfaces of the material ring 51M. However, the nitriding ammonia gas can flow between the material rings 51M from the one circumferential side of the material ring 51M to the other circumferential side of the material ring 51M at the flow speed V5, for example, from the outer circumferential side of the material ring 51M to the inner circumferential side of the material ring 51M as shown in FIG. 14. The gas flow states can be adjusted in such a manner that the gas flow speeds (wind speed) near the surface of the material ring 51M, i.e., a work, are different at the outer circumferential surface 51a, the inner circumferential surface 51b, and the both widthwise end surfaces 51c of the material ring 51M. As previously mentioned regarding the fourth embodiment, in the case of the gas nitride treatment, a large wind speed near the surface of the work tends to make shallow the hardened layer treated by the gas nitride and thus, an increased wind speed near the surface of the work tends to result in the decreased hardness (Hv) of the surface of the work. The gas flow speeds V1, V2 at the outer circumferential surface 51a, the inner circumferential surface 51b, and the both widthwise end surfaces 51c of the material ring 51M are varied by the adjustment of the blow power of the fans 85, 86, or otherwise the space gap g2 in the width direction of the material ring 51M is adjusted to have the gas flow speed V5 varied, so that the layer thicknesses Pa, Pb, Pc of the first, the second, and the third nitride layer portions 52a, 52b, 52c constituting the nitride layer 52 can be adjusted.

In the present embodiment, in the arrangement step of arranging the plurality of material rings 51M, the plurality of material rings 51M are arranged to be spaced apart from one another at the space gap g2 and, in the second gas flow step, on one of the outer and the inner circumferential sides of the material rings 51M, for example, on the inner circumferential sides of each of the material rings 51M at the space gap g2 are respectively arranged a plurality of annular louver boards 87 for adjusting the flow direction of gas, so that the second gas flow formed by part of ammonia gas at the flow speed V2 (>V1) from the inner circumferential side of the material ring 51M to the outer circumferential side of the material ring 51M (the other circumferential side of any one of the inner and the outer circumferential sides of material ring) can be produced at the flow speed V5.

It is therefore possible to sufficiently raise the gas flow speed at the both widthwise end surfaces 51c of the material ring 51M, and to produce the third nitride layer portion 52c having the layer thickness smaller than the thicknesses Pa, Pb of the first and the second nitride layer portions 52a, 52b.

The present embodiment can have an effect the same as those of the first and the fourth embodiments.

Furthermore, in the present embodiment, the speed and the direction of the second gas flow can be adjusted by the louver boards 87, thereby making it possible to adequately adjust the thicknesses Pa, Pb, Pc of the first, the second, and the third nitride layer portions 52a, 52b, 52c of the plurality of the material rings 51M.

Seventh Embodiment

Figure 15:
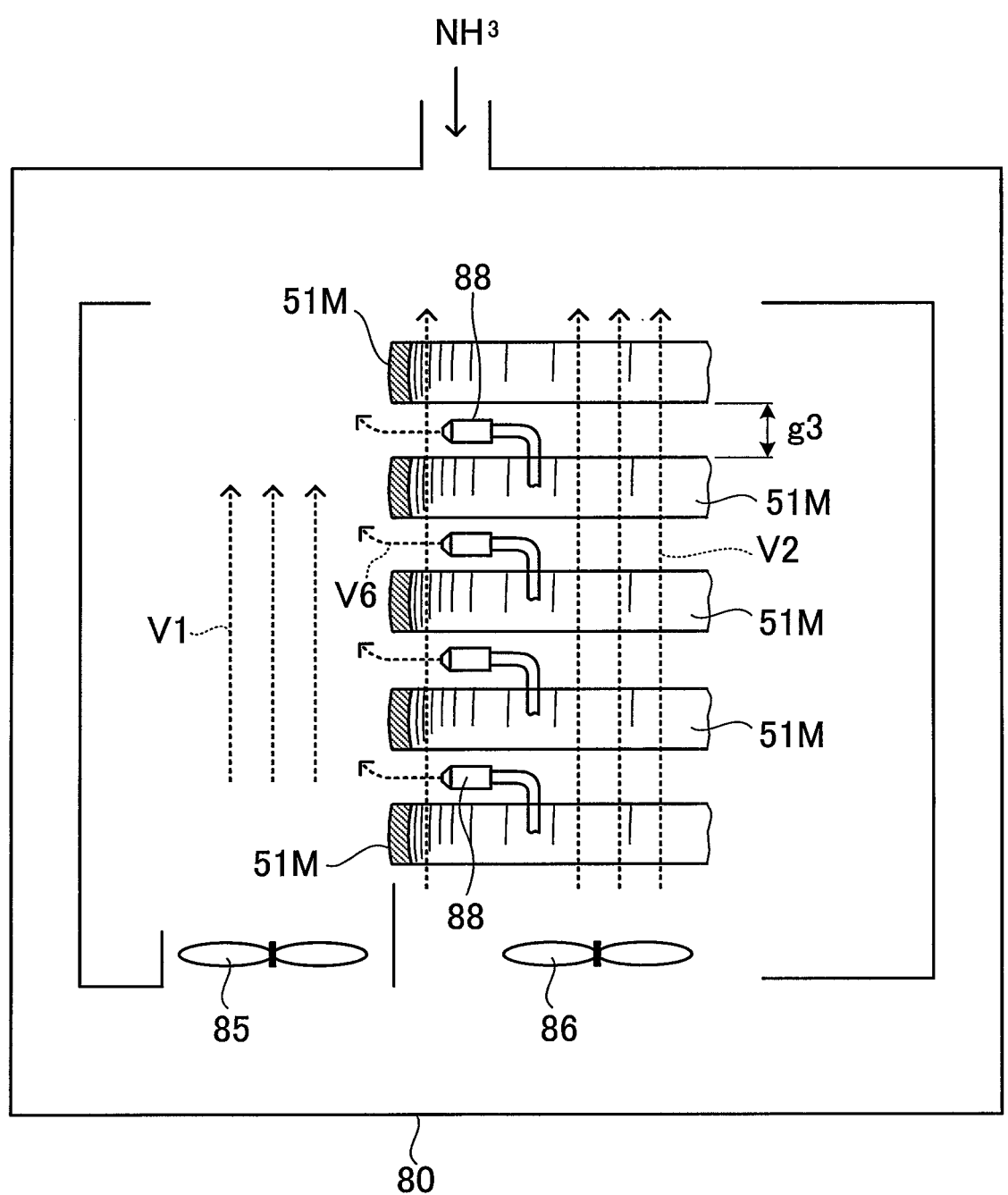
FIG. 15 is a process explanation view of a production method of a metal ring according to a seventh embodiment of the present invention.

FIG. 15 shows a method of producing a metal ring according to a seventh embodiment of the present invention.

The metal ring produced by the production method according to the present embodiment is the same as the thin plate metal ring 51 of the fourth embodiment and its production method is similar to that of the sixth embodiment, so that the following description will be directed to the nitride treatment using the material ring 51M in the fourth embodiment and thus, to the points different from those of the fourth and the sixth embodiments.

In the production method of the metal ring according to the present embodiment performs the arrangement step, the first gas flow step, and the second gas flow step in a similar manner to the sixth embodiment. Two kinds of fans 85, 86 are arranged upstream of the material rings 51M in the gas nitride tank 80.

Accordingly, the nitriding ammonia gas can flow from the inner circumferential side of the plurality of material ring 51M to the outer circumferential side of the material ring 51M as shown in FIG. 15. As previously mentioned, the gas flow speeds V1, V2 at the outer circumferential surface 51a, the inner circumferential surface 51b, and the both widthwise end surfaces 51c of the material ring 51M are varied by the adjustment of the exhaust/blow power of the fans 85, 86, or otherwise the space gap g3 in the width direction of the material rings 51M is adjusted to have the gas flow speed V6 varied, so that the layer thicknesses Pa, Pb, Pc of the first, the second, and the third nitride layer portions 52a, 52b, 52c can be adjusted.

In the present embodiment, further in the second gas flow step, on any one of the inner and the outer circumferential sides of the plurality of material rings 51M, for example, on the inner circumferential sides of the material ring 51M are respectively provided a plurality of injection nozzles 88 for injecting radially outwardly ammonia gas and nitrogen gas. The injection nozzles 88 are arranged to be spaced apart from one another at the space gap g3. The construction of the present embodiment enables the second gas flow to be produced between the neighboring two material rings 51M from the inner circumferential side of the plurality of material rings 51M to the outer circumferential side of the material rings 51M.

It is therefore possible to sufficiently raise the gas flow speed at the both widthwise end surfaces 51c of the material ring 51M, and to produce the third nitride layer portion 52c having the layer thickness Pc smaller than the thicknesses Pa, Pb of the first and the second nitride layer portions 52a, 52b.

The present embodiment can have an effect the same as that of the sixth embodiment.

Furthermore, in the present embodiment, the speed and the direction of the second gas flow can be adjusted by the injection nozzles 88, thereby making it possible to adequately adjust the thicknesses Pa, Pb, Pc of the first, the second, and the third nitride layer portions 52a, 52b, 52c of the plurality of the material rings 51M.

The plurality of injection nozzles 88 may be directed radially of the material rings 51M, or may be inclined with respect to the radial, circumferential, and/or axial directions of the material rings 51M. The plurality of injection nozzles 88 may be revolved along the material rings 51M.

Eighth Embodiment

Figure 16A:
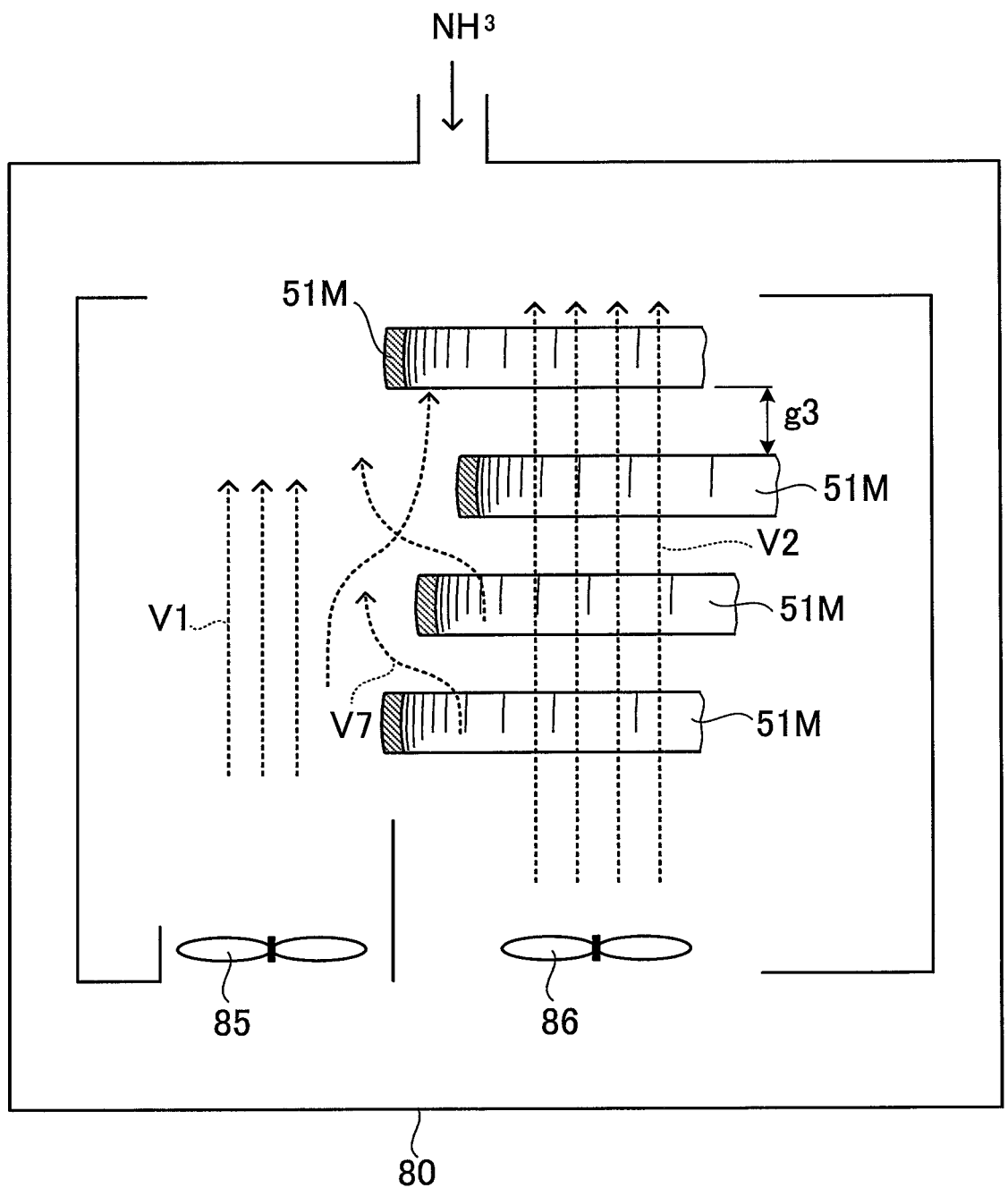
FIG. 16A is a process explanation view of a production method of a metal ring according to an eighth embodiment of the present invention, and shows a state of gas flowing in the vicinity of the surface of a material ring.
Figure 16B:
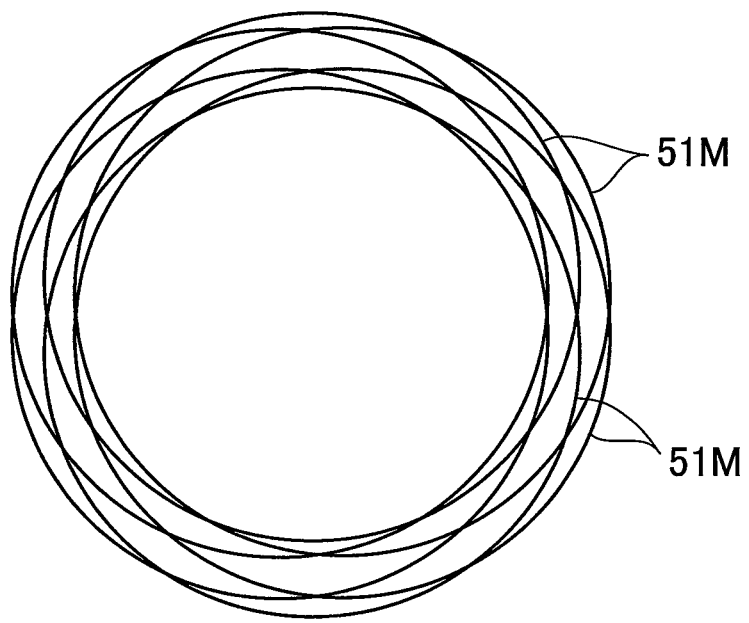
FIG. 16B is a process explanation view of a production method of the metal ring according to the eighth embodiment of the present invention, and a plan view of a plurality of material rings disposed at the time of nitriding the material rings.
Figure 17:
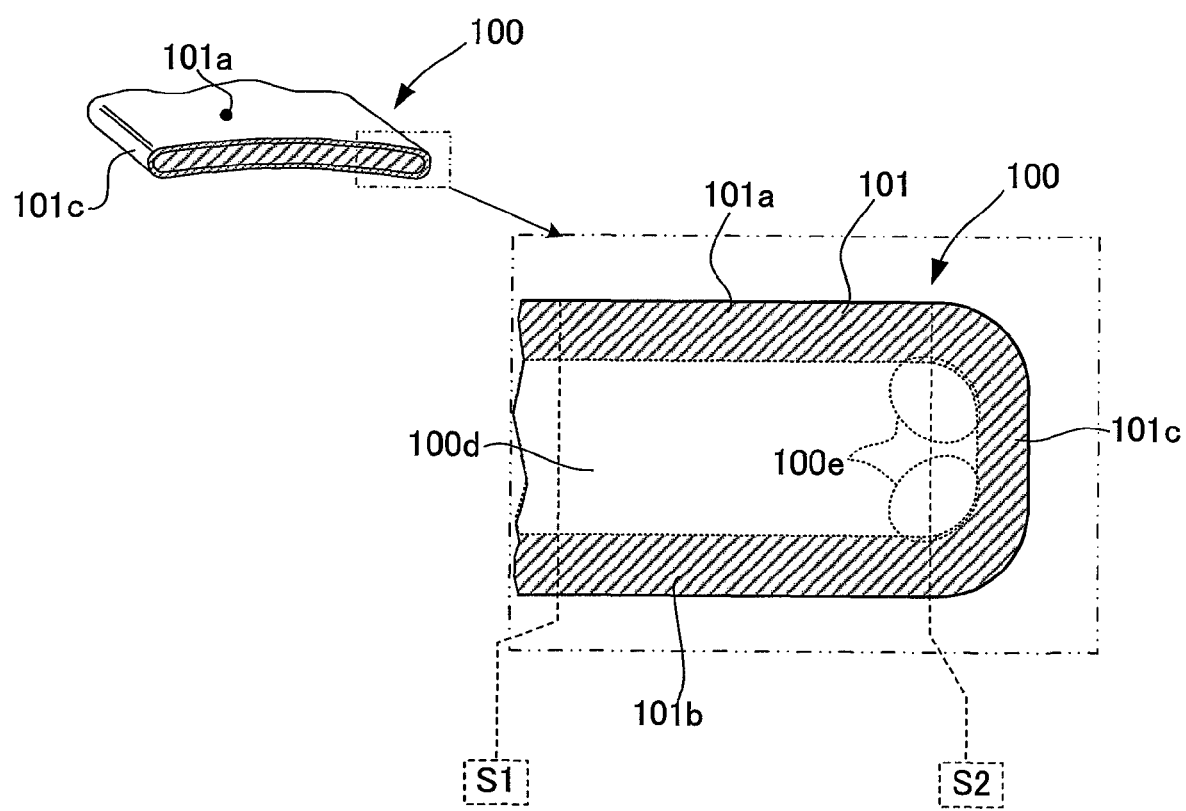
FIG. 17 is an enlarged fragmentary cross sectional view of an essential portion of a conventional metal ring.
Figure 18A:
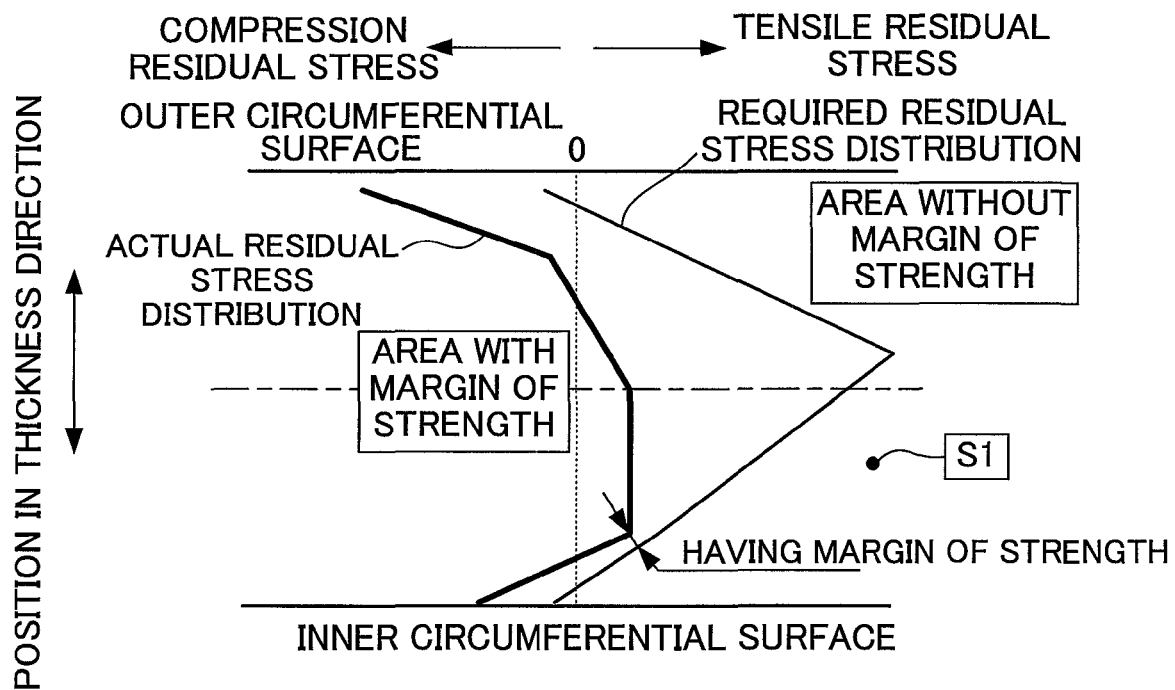
FIG. 18A is a residual stress distribution view showing an amount of margin of strength at the widthwise central portion of the conventional metal ring.

FIGS. 16A and 16B show a method of producing a metal ring according to an eighth embodiment of the present invention.

In the production method of the metal ring according to the present embodiment performs the arrangement step in which the plurality of material rings 51M are arranged at a space gap g3 in the width direction of the material rings 51M before the nitride treatment as shown in FIG. 16A, and the plurality of material rings 51M are arranged to be displaced with one another in the radial direction of the material rings 51M to have respective center axes radially spaced apart from one another and to minimize the overlapped areas of the neighboring material rings 51M as shown in FIG. 16B.

The embodiment thus described can also raise the flow speed V7 while preventing the ammonia gas from being stagnant in the space gap g3 between the neighboring material rings 51M.

The present embodiment can take two states including a first state in which the ammonia gas can flow from the inner sides of the material rings 51M to the outer sides of the material rings 51M, and a second state in which the ammonia gas can partly flow from the inner sides of the material rings 51M to the outer sides of the material rings 51M. In the state that the flow speed V2 of the ammonia gas flowing near the inner circumferential surface 51b of the material ring 51M is larger than the flow speed V1 of the ammonia gas flowing near the outer circumferential surface 51a of the material ring 51M, the flow speeds V1, V2 and the difference of the flow speeds V1, V2 are adjusted, thereby making it possible to produce the third nitride layer portions 52c having the layer thicknesses Pc smaller than either of the thickness Pa of the first nitride layer portion 52a and the thickness Pb of the second nitride layer portion 52b.

The present embodiment can expect an effect the same as that of the fourth embodiment.

Also in the present embodiment, the adjustment of the flow speeds V1, V2 and the difference of the flow speeds V1, V2 at the outer and the inner circumferential surfaces of the material rings 51M can vary the flow speed V7 near the both widthwise end portions of the material ring 51M without using any special means for varying the second gas flow, thereby making it possible to adjust the thicknesses Pa, Pb, Pc of the first, the second, and the third nitride layer portions 52a, 52b, 52c of the thin plate metal ring 51.

Although the previously mentioned embodiments have been explained about the fact that the power transmission belt 2 is mounted with the stacked body metal rings 10L, 10R on the both sides of the elements as shown in FIG. 2, the power transmission belt may be assembled in the concave portions formed to be opened outwardly on the widthwise central portion of the elements, and the present invention is not limited to the specifically formed elements. Though the stacked body metal rings 10L, 10R formed to be stacked with a multiple number of the thin plate metal rings 11, 31, 41, 51, 61 have been raised in the previously mentioned embodiments, the present invention is also applicable to two-ring stacked band-like metal rings and non-stacked band-like metal rings.

It goes without saying that the kinds of steel material for use in producing the metal rings and the kinds of gas for the nitride treatment are not particularly limited.

From the foregoing description, it will be understood that, according to the metal ring and the production of the same, the metal ring and the plurality of thin plate metal rings constituting the metal rings have the first and the second nitride layer portions at the widthwise central portion thereof and the third nitride layer portions at the both widthwise end portions thereof, the thicknesses of the third nitride layer portions being smaller than those of the first and the second nitride layer portions to suppress the tensile residual stress at the corner portions of the both widthwise end portions thereof from being raised, thereby making it possible to provide a metal ring excellent in durability by reducing the decrease in margin of strength at the both widthwise end portions of the metal ring and the concentration of tensile strength of the metal ring. Moreover, the conditions for producing the nitride layer portions or the working conditions for the nitride layer portions after the treatment are made different from each other to have the thicknesses of nitride layer portions on the end portion side formed at the widthwise end portions smaller than those on the central portion side formed at the widthwise central portion, thereby making it possible to efficiently produce the metal ring excellent in durability by reducing the decrease in margin of strength and the concentration of tensile strength at the both widthwise end portions of the metal ring. It is useful for the metal ring and the production method of the same suitable for constructing the power transmission belt for use in the continuously variable transmission by assembling a multiplicity of elements in a stacked state.

EXPLANATION OF REFERENCE NUMERALS

1: continuously variable transmission (belt type continuously variable transmission)
2: power transmission belt
4: primary pulley
5: secondary pulley
10L, 10R: stacked body metal ring
11, 31, 41, 51, 61: thin plate metal ring
11M, 31M, 41M, 51M, 61M: material ring
11a, 31a, 41a, 51a, 61a: outer circumferential surface
11b, 31b, 41b, 51b, 61b: inner circumferential surface
11c, 31c, 41c, 51c, 61c: widthwise end surface
11d, 31d, 41d, 51d, 61d: non-nitride portion
11e, 31e, 41e, 51e, 61e: corner portion
11s, 31s, 41s, 51s, 61s: surface
12, 32, 42, 52, 62: nitride layer
12a, 32a, 42a, 52a, 62a: first nitride layer portion
12b, 32b, 42b, 52b, 62b: second nitride layer portion
12c, 32c, 42c, 52c, 62c: third nitride layer portion
12d, 32d, 42d, 52d, 62d: chamfered shape portion
15: element
16A, 16B: roll
17: nitride inhibition film
18: grinding brush
80: gas nitriding tank
81, 82, 83, 84, 85, 86: fan
87: louver board
88: injection nozzle
g1, g2, g3: space gap
L1: concentration layer
L2: absentee layer
L3a: oxide film
L3c: oxide film (nitride inhibitor)
Mc: surface layer portion
Pa, Pb, Pc: layer thickness (hardened layer depth)
V1, V2, V3, V4, V5, V6, V7: flow speed

The invention claimed is:

1. A method of producing a metal ring having a nitride layer on a surface portion of the metal ring and constituting part of a metal belt of a belt type continuously variable transmission, the method comprising:

a nitride treatment step of forming the nitride layer to a material ring formed as an endless-band-like body;

a layer thickness adjustment step of making a treatment condition or an inhibition condition for nitriding in the nitride treatment step different between both widthwise end portions and a widthwise central portion of the material ring to ensure that the layer thicknesses of nitride layer portions on an end portion side formed at the both widthwise end portions of the material ring are smaller than the layer thicknesses of nitride layer portions on a central portion side formed at the widthwise central portion of the material ring;

a nitride inhibitor production step of producing nitride inhibitor at the both widthwise end portions of the material ring, and a nitriding step of nitriding the material ring after the nitride inhibitor production step in the nitride treatment to produce the nitride layer portions on the end portion side and the nitride layer portions on the central portion side;

a preparation step of preparing a cylindrical body made of steel material containing a specific strengthening element to exercise nitride inhibition action when oxidized;

an annealing step of heating the cylindrical body to its annealing temperature and producing a concentration layer near a surface of the cylindrical body to have concentration of oxide of the strengthening element higher than a remaining area other than the surface of the cylindrical body and an absentee layer below the concentration layer to have the concentration of the oxide of the strengthening element lower than the steel material;

a severing step of severing the cylindrical body after the annealing step to have a predetermined widthwise dimension to form a material ring;

a concentration layer removal step of removing the concentration layer from outer and inner circumferential portions of the material ring while leaving at least a part of the absentee layer having a predetermined thickness;

an oxidization step of oxidizing a surface of the material ring after the concentration layer removal step to produce an oxide film of the absentee layer at the widthwise central portion side of the material ring and an oxide film of the steel material at both widthwise end portion sides of the material ring, the oxide film of the steel material having the oxide of the specific strengthening element higher in concentration than that of the oxide film of the absentee layer; and a nitriding step of nitriding the material ring after the oxidization step in the state that the concentration of the oxide of the specific strengthening element between the central portion side and the end portion side of the material ring is different from each other in the nitride treatment to produce the nitride layer portions on the end portion side and the nitride layer portions on the central portion side.

2. A method of producing a metal ring having a nitride layer on a surface portion of the metal ring and constituting part of a metal belt of a belt type continuously variable transmission, the method comprising:

a nitride treatment step of forming the nitride layer to a material ring formed as an endless-band-like body;

a layer thickness adjustment step of making a treatment condition or an inhibition condition for nitriding in the nitride treatment step different between both widthwise end portions and a widthwise central portion of the material ring to ensure that the layer thicknesses of nitride layer portions on an end portion side formed at the both widthwise end portions of the material ring are smaller than the layer thicknesses of nitride layer portions on a central portion side formed at the widthwise central portion of the material ring;

a nitride inhibition film forming step of forming a nitride inhibition film on surfaces of the both widthwise end portions of the material ring; and a nitriding step of nitriding the material ring formed with the nitride inhibition film in the nitride treatment to produce the nitride layer portions on the end portion side and the nitride layer portions on the central portion side.

* * * * *